United States Patent
Debnath et al.

(10) Patent No.: US 12,542,909 B2
(45) Date of Patent: Feb. 3, 2026

(54) ANALYTICS-AWARE VIDEO COMPRESSION FOR DECISION MAKING IN TELEOPERATED VEHICLE CONTROL

(71) Applicant: NEC Laboratories America, Inc., Princeton, NJ (US)

(72) Inventors: Biplob Debnath, Princeton, NJ (US); Christoph Reich, Hessen (DE); Deep Patel, Franklin Park, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/439,341

(22) Filed: Feb. 12, 2024

(65) Prior Publication Data
US 2024/0275983 A1    Aug. 15, 2024

Related U.S. Application Data

(60) Provisional application No. 63/532,902, filed on Aug. 15, 2023, provisional application No. 63/488,810, (Continued)

(51) Int. Cl.
*H04N 19/146* (2014.01)
*G06N 20/00* (2019.01)
(Continued)

(52) U.S. Cl.
CPC ........... *H04N 19/146* (2014.11); *G06N 20/00* (2019.01); *G06V 20/49* (2022.01); *G06V 20/58* (2022.01);
(Continued)

(58) Field of Classification Search
CPC ........ H04N 19/61; G06N 20/00; G06V 20/58; G06V 20/49
See application file for complete search history.

(56) References Cited

U.S. PATENT DOCUMENTS

2017/0220879 A1* 8/2017 Nakamura ............... B60R 11/04
2018/0261020 A1  9/2018 Petousis et al.
(Continued)

FOREIGN PATENT DOCUMENTS

EP      3975133 A1    3/2022

OTHER PUBLICATIONS

Du, K., Zhang, Q., Arapin, A., Wang, H., Xia, Z., & Jiang, J. (Apr. 26, 2022). Accmpeg: Optimizing video encoding for video analytics. arXiv preprint arXiv:2204.12534.
(Continued)

*Primary Examiner* — Kyle M Lotfi
(74) *Attorney, Agent, or Firm* — Vincent Duffy; Joseph Kolodka

(57) ABSTRACT

Systems and methods are provided for optimizing video compression for remote vehicle control, including capturing, capturing video and sensor data from a vehicle using a plurality of sensors and high-resolution cameras, analyzing the captured video to identify critical regions within frames of the video using an attention-based module. Current network bandwidth is assessed and future bandwidth availability is predicted. Video compression parameters are predicted based on an analysis of the video and an assessment of the current network bandwidth using a control network, and the video is compressed based on the predicted parameters with an adaptive video compression module. The compressed video and sensor data is transmitted to a remote-control center, and received video and sensor data is decoded at the remote-control center. The vehicle is autonomously or remotely controlled from the remote-control center based on the decoded video and sensor data.

17 Claims, 12 Drawing Sheets

Related U.S. Application Data filed on Mar. 7, 2023, provisional application No. 63/445,046, filed on Feb. 13, 2023.

(51) Int. Cl.
  *G06V 20/40* (2022.01)
  *G06V 20/58* (2022.01)
  *H04N 7/18* (2006.01)
  *H04N 19/119* (2014.01)
  *H04N 19/124* (2014.01)
  *H04N 19/14* (2014.01)
  *H04N 19/154* (2014.01)
  *H04N 19/156* (2014.01)
  *H04N 19/172* (2014.01)
  *H04N 19/176* (2014.01)
  *H04N 19/177* (2014.01)
  *H04N 19/42* (2014.01)
  *H04N 19/463* (2014.01)
  *H04N 19/61* (2014.01)

(52) U.S. Cl.
  CPC ........... *H04N 7/183* (2013.01); *H04N 19/119* (2014.11); *H04N 19/124* (2014.11); *H04N 19/14* (2014.11); *H04N 19/154* (2014.11); *H04N 19/156* (2014.11); *H04N 19/172* (2014.11); *H04N 19/176* (2014.11); *H04N 19/177* (2014.11); *H04N 19/42* (2014.11); *H04N 19/463* (2014.11); *H04N 19/61* (2014.11)

(56) References Cited

U.S. PATENT DOCUMENTS

| | | |
|---|---|---|
| 2018/0278895 A1 | 9/2018 | Greenwood et al. |
| 2021/0114616 A1* | 4/2021 | Altman ................. H04W 76/15 |
| 2021/0208236 A1 | 7/2021 | John Wilson et al. |
| 2022/0182498 A1* | 6/2022 | Singh ....................... G08G 1/16 |
| 2022/0375232 A1* | 11/2022 | Furman .................. G06V 20/58 |

OTHER PUBLICATIONS

Liu, D., Li, Y., Lin, J., Li, H., & Wu, F. (Feb. 5, 2020). Deep learning-based video coding: A review and a case study. ACM Computing Surveys (CSUR), 53(1), 1-35.

Beye, F., Itsumi, H., Vitthal, C., & Nihei, K. (Oct. 16, 2022). Recognition-aware deep video compression for remote surveillance. In 2022 IEEE International Conference on Image Processing (ICIP) (pp. 1986-1990). IEEE.

* cited by examiner

ANALYTICS-AWARE VIDEO COMPRESSION FOR DECISION MAKING IN TELEOPERATED VEHICLE CONTROL

RELATED APPLICATION INFORMATION

This application claims priority to U.S. Provisional App. No. 63/445,046, filed on Feb. 13, 2023, and U.S. Provisional App. No. 63/488,810, filed on Mar. 7, 2023, and U.S. Provisional App. No. 63/532,902, filed on Aug. 15, 2023, each incorporated herein by reference in its entirety.

This application is related to an application entitled "ANALYTICS-AWARE VIDEO COMPRESSION CONTROL USING END-TO-END LEARNING", having Ser. No. 18/439,291, filed concurrently herewith, and which is incorporated by reference herein in its entirety.

BACKGROUND

Technical Field

The present invention relates to enhancements in video compression and analytics for network optimization and teleoperated vehicle control (e.g., remote, autonomous, semi-autonomous, etc.), and more particularly to an integrated system and method for remotely controlling a vehicle by utilizing adaptive video compression based on deep learning techniques to achieve optimal balance between bandwidth efficiency and the analytical accuracy of video content in varying network conditions while remotely controlling the vehicle.

Description of the Related Art

In the realm of digital video processing and networked communication, significant advancements have been made to enhance video analytics and compression technologies, which can be beneficial for remotely controlling a vehicle (e.g., teleoperated, autonomous, semi-autonomous, etc.) in real-time. Traditional video encoding methods have often prioritized either bandwidth efficiency or analytical accuracy, facing challenges in dynamically adapting to fluctuating network conditions and analytical demands. Concurrently, video analytics systems have struggled with maintaining high accuracy in object detection and tracking due to variations in video quality, often caused by static compression settings that fail to account for changing scenes or environmental conditions. These limitations underscore the necessity for a more adaptive, intelligent approach to video compression and analytics, capable of optimizing both network bandwidth and the quality of video for analytics purposes. This backdrop highlights the evolving landscape of Internet of Things (IoT) applications, including surveillance, transportation, and healthcare, which demand innovative solutions to these longstanding issues.

Lossy compression is conventionally employed to cope with dynamic network-bandwidth conditions for streaming video data over a network. While more advanced video compression algorithms are available, the de facto standard is to utilize a unified video compression standard, such as H.264 or H.265. However, these video compression standards, trade compression strength (e.g., required bandwidth) against perceptual quality. Preserving the performance of a deep learning-based vision model is not conventionally considered, and thus, severe drops in performance are often the result when vision models analyze videos compressed by H.264.

SUMMARY

According to an aspect of the present invention, a system is provided for optimizing video compression for remote vehicle control, including capturing, capturing video and sensor data from a vehicle using a plurality of sensors and high-resolution cameras, analyzing the captured video to identify critical regions within frames of the video using an attention-based module. Current network bandwidth is assessed and future bandwidth availability is predicted. Video compression parameters are predicted based on an analysis of the video and an assessment of the current network bandwidth using a control network, and the video is compressed based on the predicted parameters with an adaptive video compression module. The compressed video and sensor data are transmitted to a remote-control center, and received video and sensor data is decoded at the remote-control center. The vehicle is autonomously or remotely controlled from the remote-control center based on the decoded video and sensor data.

According to another aspect of the present invention, a method is provided for optimizing video compression for remote vehicle control, including capturing, capturing video and sensor data from a vehicle using a plurality of sensors and high-resolution cameras, analyzing the captured video to identify critical regions within frames of the video using an attention-based module. Current network bandwidth is assessed and future bandwidth availability is predicted. Video compression parameters are predicted based on an analysis of the video and an assessment of the current network bandwidth using a control network, and the video is compressed based on the predicted parameters with an adaptive video compression module. The compressed video and sensor data are transmitted to a remote-control center, and received video and sensor data is decoded at the remote-control center. The vehicle is autonomously or remotely controlled from the remote-control center based on the decoded video and sensor data.

According to another aspect of the present invention, a non-transitory computer readable medium is provided for optimizing video compression for remote vehicle control, including capturing, capturing video and sensor data from a vehicle using a plurality of sensors and high-resolution cameras, analyzing the captured video to identify critical regions within frames of the video using an attention-based module. Current network bandwidth is assessed and future bandwidth availability is predicted. Video compression parameters are predicted based on an analysis of the video and an assessment of the current network bandwidth using a control network, and the video is compressed based on the predicted parameters with an adaptive video compression module. The compressed video and sensor data is transmitted to a remote-control center, and received video and sensor data is decoded at the remote-control center. The vehicle is autonomously or remotely controlled from the remote-control center based on the decoded video and sensor data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
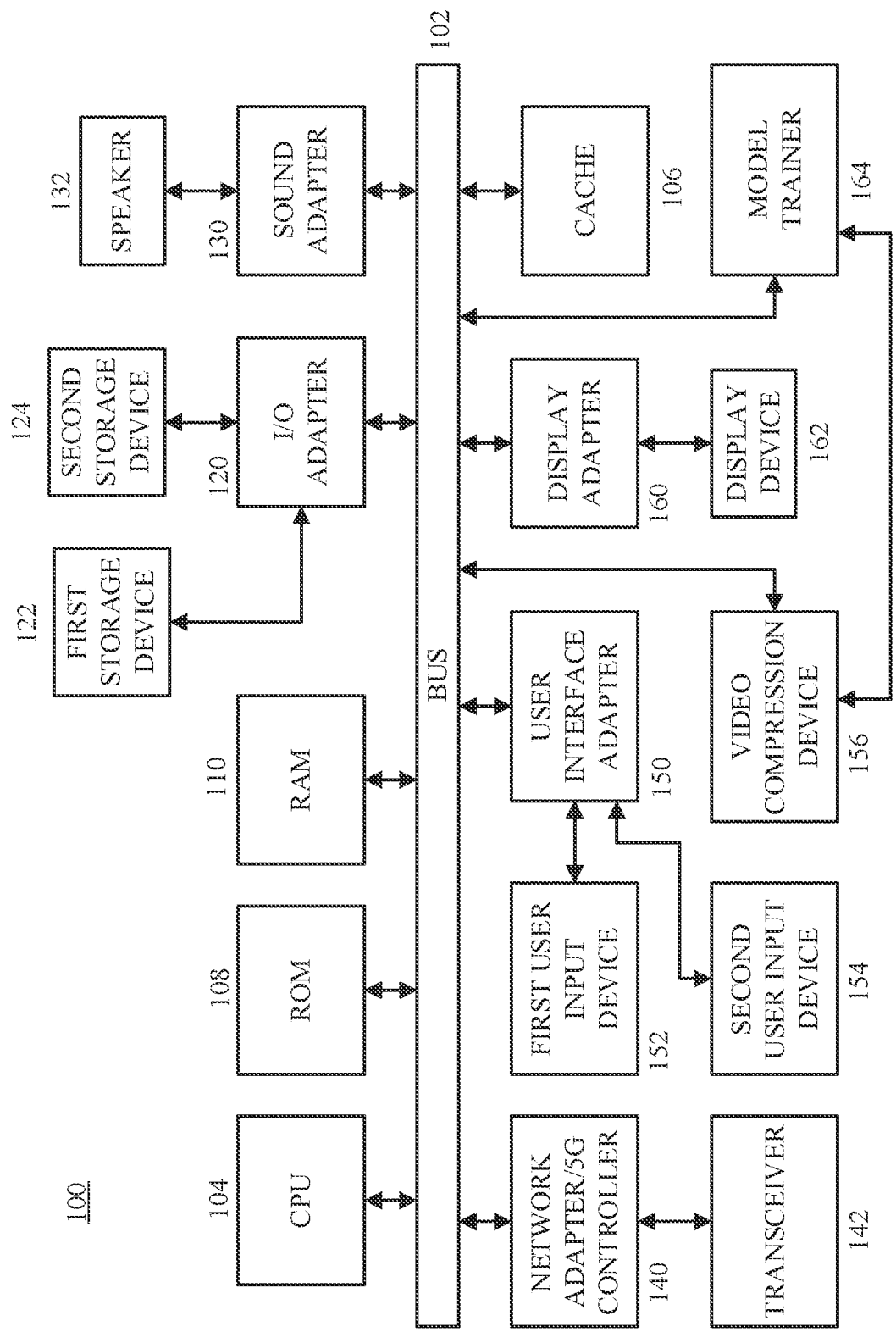
FIG. 1 is a block diagram illustratively depicting an exemplary processing system to which the present invention may be applied, in accordance with embodiments of the present invention.

In accordance with embodiments of the present invention, systems and methods are provided for enhancements in video compression and analytics for network optimization and improved video analysis. More particularly, the present invention can include an integrated system and method for adaptively controlling video compression based on deep learning techniques to optimize network bandwidth usage while maintaining high-quality video for analytics. The present invention can utilize surrogate model-based video encoding with reinforcement learning for dynamic adjustment of encoding parameters to achieve an optimal balance between bandwidth efficiency and the analytical accuracy of video content in varying network conditions.

In some embodiments, the present invention can control, for example, H.264 compression for preserving the performance of deep learning-based vision models. A differentiable surrogate model of a nondifferentiable H.264 codec can be employed to enable end-to-end learning with feedback from the server-side deep learning-based vision model, and task-agnostic end-to-end training for learning a lightweight control network can be utilized to manipulate the H.264 encoding. In some embodiments, the control network can learn to predict the optimal H.264 codec parameters for preserving the performance of a server-side vision model, while targeting a dynamic network-bandwidth condition.

Streamed video data is a major source of internet traffic. A significant and increasing amount of this video data is consumed and analyzed by deep learning-based vision models deployed on cloud servers. Streaming video data over a network with dynamic network conditions conventionally requires lossy video compression in order to meet network bandwidth constraints, but conventional deep learning-based vision models fail to provide adequate performance when analyzing lossy compressed videos in real-world streaming settings in practice.

The most common conventional approach for lossy video compression is to utilize a standardized video codec, such as H.264 or H.265. The H. 264 video codec was developed to find the best trade-off between compression and uniformly preserving the perceptual quality. However, this is not optimal for deep learning-based vision models since they conventionally focus on particular salient parts of an image or video. Motivated by the performance gains and computing and processor resources savings, and that the H.264 is conventionally the de facto standard for video compression, the present invention can extend the H. 264 codec by predicting the optimal codec parameters for the current content and network-bandwidth condition, in accordance with aspects of the present invention.

In some embodiments, the present invention can control the H.264 codec (or any other codecs) by setting the optimal codec parameters to facilitate a content and network bandwidth aware dynamic compression, optimized for deep neural networks. In particular, a lightweight control network can be learned in an end-to-end setting to predict fine-grain codec parameters based on the current content and bandwidth constraint in order to preserve the performance of the server-side deep learning models, while targeting to meet the bandwidth constraint.

In various embodiments, the present invention does not include developing a new video codec for machines, but rather to control conventional codecs (e.g., the widely used H. 264 codec) for deep learning-based vision models as content and network bandwidth changes. Many already existing H.264-based implementations can be extended with a minor effort to utilize the control network of the present invention, rather than deploying a non-standardized video codec, which is conventionally not practical. Vision feature codecs often assume that the same feature extractor is employed, and thus, the server-side model needs to support the specific features. Additionally, just encoding and transferring vision features, drastically limits the option for human interventions, whereas the end-to-end learnable codec control of the present invention is not required to make any assumptions about the deep neural network utilized on the server-side.

In various embodiments, the encoding can be optimized for deep vision models, but it can still perform standard H.264 encoding and decoding on the video level, allowing for human interventions as desired. Conventional vision task-specific deep learning-based compression approaches offer strong compression results and can preserve the performance of a deep vision model, but similarly to other more general deep learning-based video compression approaches, task-specific deep learning-based compression approaches suffer from practical issues in real-world deployments, including the strong computational overhead and processor requirements induced by these approaches, and the very limited controllability with respect to the bandwidth. In various embodiments, H. 264 offers strong support for different compression strengths and can adapt to a wide range of bandwidths (typically multiple orders of magnitudes), H.264 encoding/decoding is computationally efficient, and our lightweight edge device side control network only adds a small amount of computational overhead, which increases processing speed and reduces required network resources, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods, and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more video cameras 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. A video compression device 156 can process received video input, and a model trainer 164 (e.g., neural network trainer) can be operatively connected to the system 100 for controlling video codec for deep learning analytics using end-to-end learning, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, 400, 500, 700, 800, 900, and 1100 described below with respect to FIGS. 2, 3, 4A, 4B, 5, 7, 8, 9, and 11, respectively, are systems for implementing respective embodiments of the present invention. Part or all of processing system 100 may be implemented in one or more of the elements of systems 200, 300, 400, 500, 700, 800, 900, and 1100, in accordance with aspects of the present invention.

Further, it is to be appreciated that processing system 100 may perform at least part of the methods described herein including, for example, at least part of methods 200, 300, 400, 500, 600, 700, 800, and 1000, described below with respect to FIGS. 2, 3, 4A, 4B, 5, 6, 7, 8, 9, and 10, respectively. Similarly, part or all of systems 200, 300, 400, 500, 700, 800, 900, and 1100 may be used to perform at least part of methods 200, 300, 400, 500, 600, 700, 800, and 1000 of FIGS. 2, 3, 4A, 4B, 5, 6, 7, 8, 9, and 10, respectively, in accordance with aspects of the present invention.

As employed herein, the term "hardware processor subsystem," "processor," or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
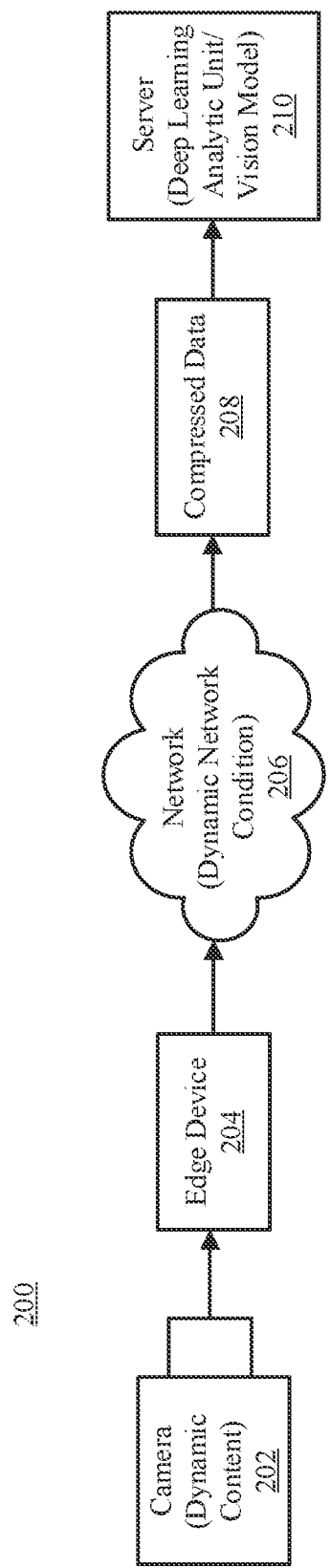
FIG. 2 is a diagram illustratively depicting a high-level view of a system and method for dynamic video compression and analysis for streaming video data over a network, in accordance with embodiments of the present invention.

Referring now to FIG. 2, a high-level view of a system and method 200 for dynamic video compression and analysis for streaming video data over a network, is illustratively depicted in accordance with embodiments of the present invention.

In an illustrative embodiment, a camera system 202 can be utilized to monitor an area of interest and/or capture live video and/or image data (e.g., dynamic content). The data can be transmitted to an edge device 204, which can serve as an initial processing point, including performing preliminary data compression, formatting, analysis, etc. before sending the video and/or image data to the network 206, which can include dynamic network conditions. In some embodiments, within the network 206, which represents various dynamic network conditions, the video data may be further compressed, shaped, or prioritized based on current bandwidth and latency metrics to ensure efficient transmission, in accordance with aspects of the present invention. Network 206 can dynamically adapt the data transmission based on real-time network traffic, bandwidth availability, and various other metrics, potentially altering the data's compression to suit the network conditions. The compressed data 208 represents the video data post network optimization, which is now streamlined for transmission efficiency and ready for analytical processing.

In some embodiments, the data next can be received by the Server (Deep Learning Analytic Unit/Vision Model) 210, where advanced video analytics can be performed. This server 210 can utilize deep learning models to analyze the video data for various applications, such as object detection, recognition, and tracking, and to extract meaningful insights from the compressed video data, in accordance with aspects of the present invention. Each block in FIG. 2 represents important steps in the process of capturing, transmitting, and analyzing video data in real-time, ensuring that the dynamic content captured by the camera 202 is efficiently processed and analyzed despite the constraints and variability of network conditions.

While the single camera system 202 is shown in FIG. 2 for the sakes of illustration and brevity, it is to be appreciated that multiple camera systems can also be used, in accordance with aspects of the present invention.

In an illustrative embodiment, based on the general video streaming setting shown in FIG. 2, a codec control can be formulated as a constrained planning problem as follows:

$$\max_{(codec\ parameters)} \text{Analytics Model Performance} \quad (1)$$
$$\text{s.t. Bitrate} \leq \text{Target Bandwidth}$$

For example, a target bandwidth constraint of 105 bits per second can be satisfied by range of codec parameter values (e.g., Quantization Parameter (QP) values from at least 20 to 30) and Equation (1) can select a codec parameter value that results in the maximum possible accuracy of the analytics model, given the target bandwidth constraint. In some embodiments, H. 264 encoding parameters for preserving the performance of a server-side deep vision model while matching a current network-bandwidth requirement can be predicted, and in practice, multiple parameter configurations can satisfy Equation (1).

In some embodiments, given a short video clip and the currently available network bandwidth, the present invention can estimate the codec parameters such that the resulting video stream does not exceed the available network bandwidth. Additionally, when analyzing the encoded/decoded clip with a deep-learning vision model, the performance can be maintained as compared to the performance on the raw clip. Formally, three control requirements to be met by our H. 264 control can be defined: (i) maintain the performance of the server-side deep learning-based vision model, (ii) do not exceed the available bandwidth, preventing information from being dropped by the network, and (iii) perform the codec parameter prediction and encoding in a single forward pass, avoiding complicated feedback loops or multipass encoding, in accordance with aspects of the present invention.

In various embodiments, the present invention can include an end-to-end learnable control of the H. 264 video compression standard for deep learning-based vision models. The present invention can include utilizing a differentiable surrogate model of the non-differentiable H. 264 video codec, which enables differentiating through the video encoding and decoding. In particular, we can propagate gradients from the server-side deep learning vision model through the codec to learn our codec control. Further, a task-agnostic end-to-end training formulation for learning a lightweight edge device side control network to control the H.264 for deep vision models can be implemented utilizing the surrogate model. By utilizing a differentiable surrogate model of the non-differentiable H. 264 codec, we ensure a full differentiability of pipeline. This allows us to utilize end-to-end self-supervised learning, circumventing the use of reinforcement learning, in accordance with aspects of the present invention.

Conventional systems and methods utilize the feedback of a cloud server to decide how a video should be compressed for the server-side deep network. However, a feedback loop leads to a complicated architecture, requires additional bandwidth for the feedback, and adds an additional point of failure, limiting the applicability of such approaches. These approaches also assume that the server-side network runs only a specific task (e.g., object detection). In avoidance of such drawbacks, the present invention can utilize a feedback loop-free and server-side task agnostic codec control pipeline, in accordance with various aspects of the present invention.

Figure 3:
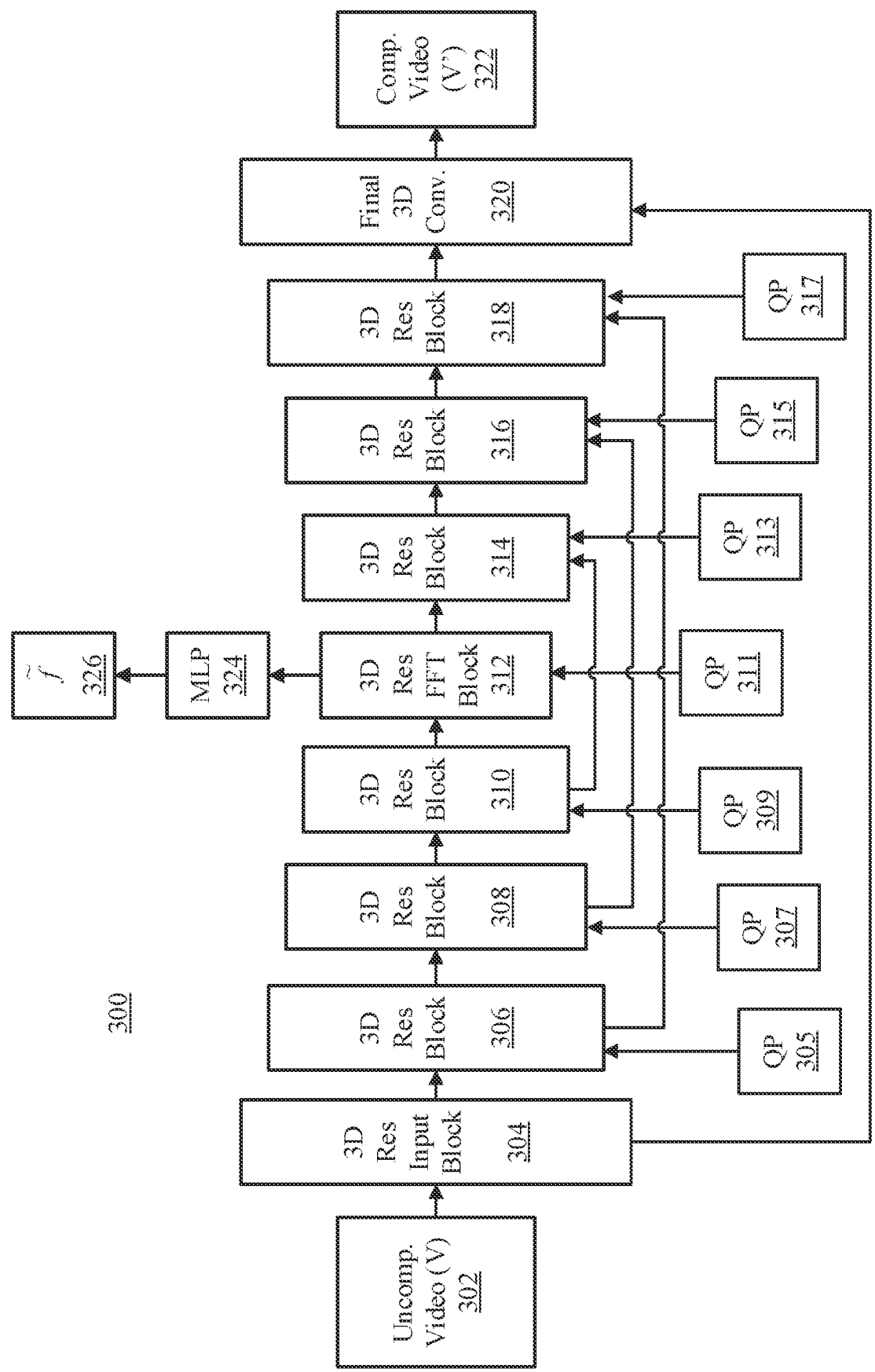
FIG. 3 is a diagram illustratively depicting an adaptive video compression system and method including a surrogate model architecture for optimizing video encoding parameters in real-time using machine learning, in accordance with embodiments of the present invention.

Referring now to FIG. 3, a diagram showing an adaptive video compression system and method 300 including a surrogate model architecture for optimizing video encoding parameters in real-time using machine learning, is illustratively depicted in accordance with embodiments of the present invention.

In accordance with embodiments of the present invention, note that H.264/AVC performs efficient video compression by making use of image compression techniques and temporal redundancies. The predictive coding architecture of the H. 264 codec utilizes sophisticated hand-crafted transformations in order to analyze redundancy within videos. A macroblock-wise motion-compensated discrete cosine transform followed by a quantization step can be used to perform compression. In the standard setting, H. 264 performs lossy compression but also supports lossless compression. In practice, H. 264 is conventionally employed as a lossy compression algorithm to aggressively compress videos.

The H. 264 codec allows for a variety of different customizations to the compression process. A crucial codec parameter for controlling the compression strength and video quality is the quantization parameter (QP), controlling how strong the transformation coefficients can be quantized. QP ranges from 0 to 51 (integer range), with high values leading to stronger compression. While strong compression leads to reduced file sizes/bandwidth, this is at the cost of perceptual quality. For a given set of codec parameters, the file size/bandwidth remains dependent on the video content in a non-trivial manner.

The group of pictures (GOP) size also influences the resulting compression, by controlling which frames should be encoded as an I, B, or P-frame. I-frames (intra-coded frames) are only compressed by utilizing spatial redundancies (similar to image compression), whereas B-frames (bidirectional predicted frames) and P-frames (predicted frames) are compressed by also using information from adjacent frames. In particular, B-frames are compressed by utilizing a previous and a subsequent I- or P-frame. For compressing P-frames only a single previous I- or P-frame is used. I-frames typically require more bits than B and I frames. The quantization parameters (QP) highly influence the performance of current action recognition models. For example, when employing a QP value of 51, the accuracy of all models drops from above 70% (no compression) to below 50%. In particular, the R(2+1)D-50 model achieves an accuracy of 74.01% with no H. 264 employed but using full compression (QP=51), the accuracy drops down to 34.67%, halving the performance. Generally, a similar behavior is observed for other H.264 parameters (e.g., constant rate factor and GOP) and demonstrated training on compressed videos also entails a performance drop.

H. 264 offers support for macroblock-wise quantization, in which regions of the video, in this exemplary case, 16× 16 frame patches (macroblocks), are compressed with varying QP values. Thus, irrelevant regions can be compressed with a high QP value (strong compression) and relevant regions with a lower QP value (less compression). In various embodiments, macroblock-wise quantization can be employed to facilitate a fine-grain spatial and temporal control of the compression strength, in accordance with aspects of the present invention.

Macroblock-wise quantization offers several major advantages over standard region-of-interest approaches. While region-of-interest-based approaches detect a single and small region of interest, macroblock-wise quantization can express multiple interesting regions. The ability to express multiple regions of interest enables macroblock-wise quantization to adapt to complex scenes without inducing ambiguities, maintaining the analytics performance. Fully discarding unimportant regions, as conventionally done by region-of-interest-based approaches, limits the applicability to other vision tasks. Macroblock-wise quantization does not fully discard unimportant regions but performs aggressive compression on these regions. The resulting data can still be utilized for other vision tasks, such as object detection, in accordance with aspects of the present invention.

Supporting only a single region of interest (e.g., conventionally done by region-of-interest-based approaches) can induce ambiguities, subsequently deteriorating the analytic performance of complex action recognition tasks. For illustration, consider the example of a child walking a dog. In order to correctly classify the present action (e.g., walking the dog), an action recognition model needs to be informed of the child, the dog leash, and the dog. Otherwise, ambiguities are introduced and the action recognition model might predict the action walking or running. Similarly, with respect to an example of a person playing basketball, without being informed of the basketball hoop, it is not clear if the person is just throwing a ball or if the person is playing basketball.

In various embodiments, macroblock-wise quantization overcomes these limitations by offering support for multiple regions of interest and retaining the context of the entire frame. In general, macroblock-wise compression can be intuitively interpreted as a soft generalization of region-of-interest approaches with support for multiple regions of interest in a single frame. This flexibility and generalization enables a wide application of our codec control pipeline to different vision tasks, such as action recognition, object detection, or instance segmentation, in accordance with aspects of the present invention.

Formally, we consider the macroblock-wise H. 264 codec as a function mapping from the original video V and QP parameters QP to both the encoded and decoded video $\hat{V}$ and the file size f of the encoded video:

$$H.264(V, QP) = (\hat{V}, f), f \in \mathbb{R}^+ \quad (2)$$

$$V, \hat{V} \in \{0, \ldots, 255\}^{3 \times T \times H \times W},$$

$$QP \in \{0, \ldots, 51\}^{T \times H/16 \times W/16}.$$

where T indicates the video length and H×W the spatial dimensions of the RGB video. Other H. 264 parameters are considered to be constant.

In practice, this H. 264 function (Equation (2)) is not differentiable with respect to the QP parameters (compression strength). To overcome this limitation, the present invention can utilize a differentiable surrogate model for the H. 264 codec. This surrogate model enables us to train a control network with gradient information from both the server-side model and the generated bandwidth. Intuitively, this surrogate model fulfills two tasks during training. Firstly, it allows the control network to explore and learn which regions are important for the server side model prediction based on gradient information, and secondly, the control network can learn the non-trivial relationship between the codec parameters (QP) and the file size (required bandwidth) of the compressed video, in accordance with aspects of the present invention.

In various embodiments, the architecture illustrating an adaptive video compression system and method 300 (e.g., H.264 surrogate model architecture) for optimizing video encoding parameters in real time using machine learning, can be based on a 3D residual U-Net with Conditional Group Normalization (CGN). In block 302, uncompressed video (V) can be fed into a 3D Residual Input Block 304. This block is designed to process the initial video frames, preparing them for subsequent layers by extracting initial feature representations. The system can include multiple 3D Residual Blocks 306, 308, 310, 316, and 318, each receiving Quantization Parameters (QP) 305, 307, 309, 313, 315, and 317, respectively, which can adjust the level of compression applied at each stage, in accordance with aspects of the present invention.

In some embodiments, a 3D Residual Fast Fourier Transform (FFT) Block 312 is incorporated to transform spatial domain data into the frequency domain, enhancing the model's ability to handle various frequency components within the video data efficiently. The QP 311 associated with this block allows for selective frequency compression, which can be crucial for preserving important information while reducing file size. The Multi-Layer Perceptron (MLP) 324 can be utilized to predict the final file size 326 ($\hat{f}$) of the compressed video. This prediction is used to adjust the QPs dynamically, ensuring the compressed video does not exceed bandwidth limitations while maintaining quality, in accordance with aspects of the present invention.

The final stage involves a Final 3D Convolution Block 320 that consolidates the processed data into a format suitable for reconstruction, leading to the output of the compressed video (V') 322. Each block in the system can be interconnected, with QPs feeding into each, indicating a sophisticated control mechanism over the compression process. This system architecture demonstrates an advanced approach to real-time adaptive video compression, leveraging deep learning to maintain video quality in the face of bandwidth constraints and network variability, in accordance with aspects of the present invention.

The U-Net's encoder-decoder structure takes in the uncompressed video V and predicts the approximated compressed video $\tilde{V}$. Each encoder and decoder block are conditioned on the given QP parameters by utilizing CGN. Based on the average pooled features of the bottleneck block, a multilayer perceptron (MLP) predicts the approximated file size $\hat{f}$ of the encoded video. Note that the surrogate model 300 uses one-hot encoded QP parameters, denoted as $qp \in [0,1]^{51 \times T \times H/16 \times W/16}$. This design choice allows for later formulating the prediction of the integer-valued QP parameters by the control network as a classification problem, in accordance with aspects of the present invention.

Figure 4B:
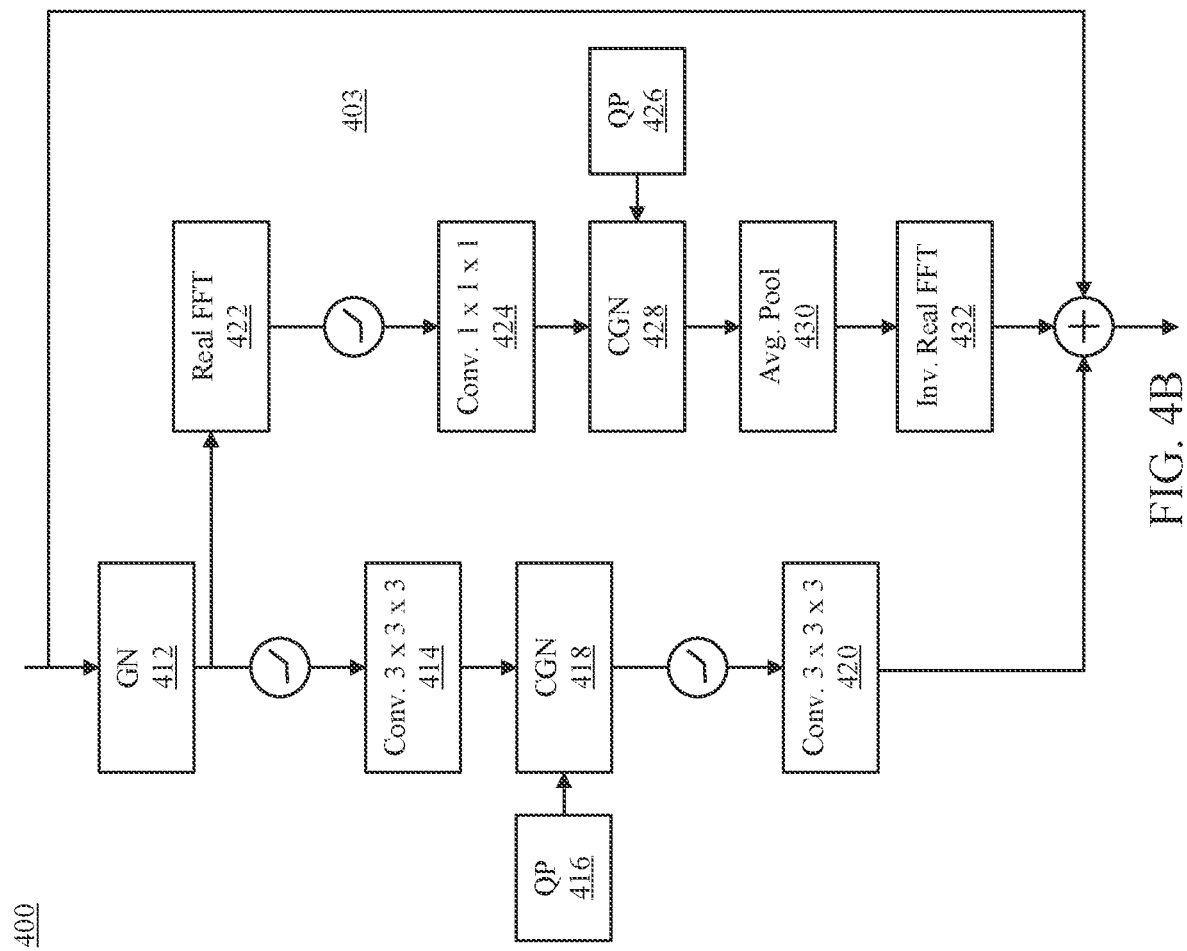
FIG. 4B is a diagram illustratively depicting a system and method for video processing using a surrogate model block configuration including a 3D residual Fast Fourier Transform (FFT) block, in accordance with embodiments of the present invention.
Figure 4A:
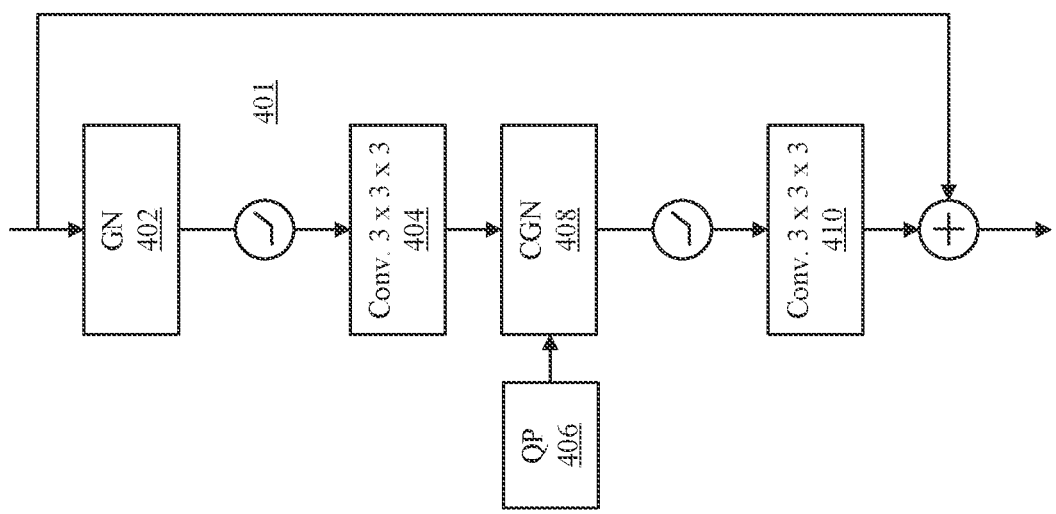
FIG. 4A is a diagram illustratively depicting a system and method for video processing using a surrogate model block configuration including a 3D residual block, in accordance with embodiments of the present invention.

Referring now to FIG. 4A, a diagram showing a system and method 400 for video processing using a surrogate model block configuration including a 3D residual block 401, is illustratively depicted in accordance with embodiments of the present invention.

In some embodiments, a 3D residual block architecture 401 for video processing can include a Group Normalization (GN) layer 402, which can normalize the features within a group of channels to stabilize the learning process. This can be followed by a convolutional layer 404 with a kernel size of 3×3×3, denoted by the symbol with a diagonal line, which indicates that this layer performs spatial-temporal convolution on the input features. The Quantization Parameters (QP) 406 are fed into a Conditional Group Normalization (CGN) layer 408, suggesting that this layer adjusts its normalization based on the QP, which can modulate compression to balance video quality and size. Another convolutional layer 410, also with a kernel size of 3×3×3, processes the normalized features. The output of this convolutional layer is then combined with the output of a previous layer or input feature map through the plus sign in the circle, which symbolizes an element-wise addition, indicative of a residual learning connection within the block. Each block and connection within FIG. 4A represents a step in processing video data, enhancing the model's ability to extract features and compress video data effectively while being conditioned by the quantization parameters for optimal encoding, in accordance with aspects of the present invention This configuration within FIG. 4A can enable the neural network model to learn and adapt to various data features and conditions, which can be particularly advantageous in video processing applications that require dynamic adjustment to compression and quality parameters.

In various embodiments, a core building block of the surrogate model is a 3D residual block. The 3D residual block first performs standard Group Normalization (GN), before the normalized features are fed into a Gaussian Error Linear Unit (GELU) activation. The resulting features are fed into a 3×3×3 convolution. Next, CGN can be used to incorporate the QP parameters. A GELU can be utilized as a non-linearity before a 3×3×3 convolution is employed. Next, a residual addition can be performed. Encoder blocks can employ a spatial stride of two in the second convolution for spatial downsampling. The decoder can utilize trilinear interpolation to upsample the spatial dimensions again before every block. The skip connection can utilize a 1×1×1 convolution and an optimal stride to match the output feature size. The 3D residual input block can utilize an augmented version of the 3D residual block, omitting the first GN and GELU, and additionally, CGN can be replaced with GN, in accordance with aspects of the present invention.

Referring now to FIG. 4B, a diagram showing a system and method 400 for video processing using a surrogate model block configuration including a 3D residual Fast Fourier Transform (FFT) block 403, is illustratively depicted in accordance with embodiments of the present invention.

In various embodiments, a 3D residual FFT bottleneck block 403 can be initiated with a Group Normalization (GN) layer 412, which can normalize the input data across a set of channels. Following the GN layer, a convolutional layer 414 with a kernel size of 3×3×3 can perform spatial-temporal feature extraction. Quantization Parameters (QP) 416 can be input into a Conditional Group Normalization (CGN) layer 418, which can conditionally adjust the normalization process according to the QP. Subsequently, another convolutional layer 420 with a kernel size of 3×3×3 can further process the features. On a parallel branch, a Real Fast Fourier Transform (FFT) layer 422 can transform the feature set into the frequency domain, which is then processed by a smaller convolutional layer 424 with a kernel size of 1×1×1. A second CGN layer 428, also receiving QP 426, can normalize these features.

In some embodiments, an Average Pooling layer 430 can reduce the spatial dimensions of the feature set, followed by an Inverse Real FFT layer 432, which can transform the features back into the spatial domain. The outputs of both branches can then be merged using an element-wise addition, as indicated by the plus sign, forming the output of the 3D residual FFT bottleneck block 403, in accordance with aspects of the present invention.

In some embodiments, inspired by H.264, which utilizes the discrete cosine transform as part of the compression procedure, the present invention can utilize a 3D residual FFT block in the bottleneck stage of the U-Net. This block can introduce inductive biases related to the original H. 264 compression. The standard 3D residual block can be extended by a Fourier branch. This branch can perform a real FFT 422 on the normalized feature maps before employing a GELU activation, a 1×1×1 convolution 424, a CGN layer 428, and an average pooling layer 430 to the features in frequency space. Finally, an inverse real FFT is used to transform the features back into the spatio-temporal domain. The resulting features can be added to the output features.

In order to encode the information of the QP parameters into our surrogate model architecture, Conditional Group Normalization can be utilized. Similar to Conditional Batch normalization can be performed without fixed affine parameters. We predict the affine transformation, after normalization, based on the input QP parameters. Formally, the Conditional Group Normalization layer can be defined as:

$$\hat{X} = MLP_\mu(qp) \cdot GroupNorm(X) + MLP_\sigma(qp)$$

where X is a 4 D spatio-temporal input feature map and X̂ is the output feature map of the same shape. GroupNorm donates the standard Group Normalization operation without affine parameters, applied to the channel dimension, over a pre-defined number of groups. Two point-wise multilayer perceptrons ($MLP_\mu$ & $MLP_\sigma$) can predict the affine transformation based on the one-hot qp parameters. In practice, MLP can be implemented as two 1×1×1 convolutions with GELU activation. To ensure matching spatial dimensions between the feature map and transformation, nearest neighbor interpolation can be employed to the output of $MLP_\mu$ and $MLP_\sigma$.

In various embodiments, the surrogate model can approximate both the H. 264 function (Equation (2)) and its derivative. Based on the control variates theory, the surrogate model can become a low-variance gradient estimator of Equation. (2) if the difference between the output of the surrogate model and the true H. 264 function is minimized, and the two output distributions are maximizing the correlation coefficients ρ. We can enforce both requirements for $\tilde{V}$ and $\tilde{f}$ by minimizing:

$$\mathcal{L}_s = \mathcal{L}_{s_v} + \mathcal{L}_{s_f}$$

during training. Where $\mathcal{L}_{s_v}$ is computed with the approximated compressed video $\tilde{V}$, where $\mathcal{L}_{s_f}$ is computed based on the predicted file size $\tilde{f}$. As the video surrogate loss $\mathcal{L} s_v$, the present invention can utilize:

$$\mathcal{L}_{s_v} = -\alpha_{\rho_v}\mathcal{L}_{\rho_v} + \alpha_{SSIM}\mathcal{L}_{SSIM} + \alpha_{FF}\mathcal{L}_{FF}$$

where $\mathcal{L}_{\rho_v}$ is the correlation coefficient loss [65] ensuring the correlation coefficient ρ is maximized. $\mathcal{L}_{SSIM}$ is the structural similarity (SSIM) loss [84] and $\mathcal{L}_{FF}$ donates the focal frequency loss.

In some embodiments, both the SSIM loss and the focal frequency loss are employed to ensure that the difference between $\hat{V}$ and $\tilde{V}$ is minimized. We motivate the use of the focal frequency loss $\mathcal{L}_{FF}$ by the discrete cosine transform-based compression of the H. 264 codec. Since H. 264 performs macroblock-wise quantization, we can also apply the focal frequency loss $\mathcal{L}_{FF}$ on a per-macroblock level. As the file size surrogate loss $\mathcal{L}_{s_f}$, we can use:

$$\mathcal{L}_{s_f} = -\alpha_{\rho_f}\mathcal{L}_{\rho_f} + \alpha_{L1}\mathcal{L}_{L1}$$

where $\mathcal{L}_{\rho_f}$ is the correlation coefficient loss between the true file size f and the predicted file size $\hat{f}$. For minimizing the difference between f and $\hat{f}$ an L1 loss $\mathcal{L}_{L1}$ is used. Note that we learn the file size in $\log_{10}$ space, due to the large range of file sizes, and $\alpha_{\rho_v}$, $\alpha_{SSIM}$, $\alpha_{FF}$, $\alpha_{\rho_f}$ and $\alpha_{L1}$ denote the respective positive weight factors, in accordance with aspects of the present invention.

Figure 5:
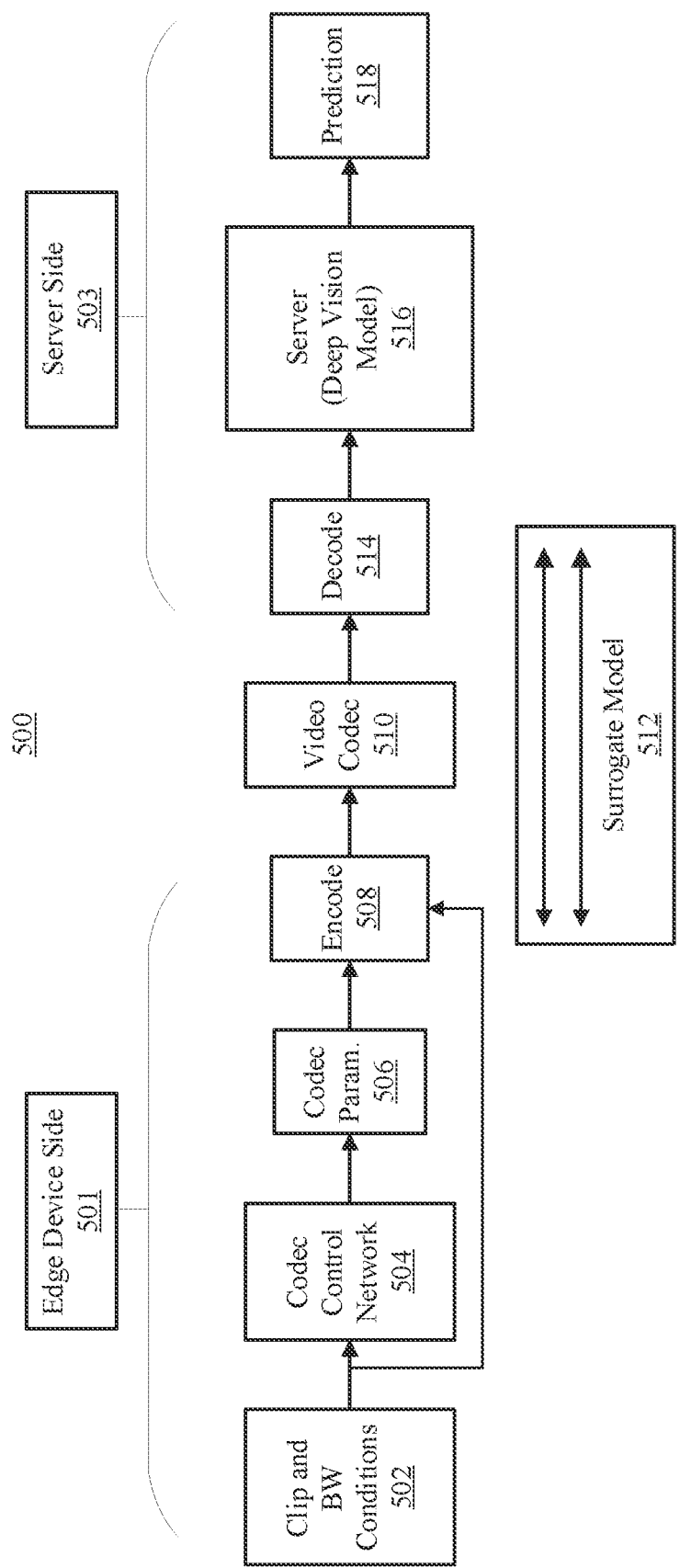
FIG. 5 is a diagram illustratively depicting a system and method for end-to-end codec control for video compression systems, in accordance with embodiments of the present invention.

Referring now to FIG. 5, a diagram showing a system and method 500 for end-to-end deep video codec control for video compression systems is illustratively depicted in accordance with embodiments of the present invention.

In various embodiments, an Edge Device Side 501 can initiate the process with the edge device components. This segment can include the functionalities of capturing frames, bandwidth determination, and initial codec parameter prediction processes, which can be critical for adapting the video stream to the dynamic conditions of the network and the requirements of the edge device. The server side 503 represents the server-side operations that receive the encoded video stream. The server side is responsible for decoding the video and conducting deep learning analyses, such as action recognition, through the server's deep vision model. The outcome of this process is the prediction output, which is the analytical result based on the compressed video content after considering the optimal compression parameters to maintain performance fidelity despite the compression process.

In some embodiments, block 502 can represent an input/received video clip along with current network bandwidth conditions. The video clip is the raw footage to be compressed and streamed, and the bandwidth conditions dictate the maximum allowable data rate for transmission to avoid network congestion or data loss. In block 504, a codec control network can be utilized as a deep learning model to predict optimal codec parameters for video compression based on the input video clip and dynamic network bandwidth conditions. It can maximize the performance of downstream deep vision models without exceeding the network's bandwidth limitations. Block 506 represents quantization parameters predicted by the codec control network in block 504. They can determine the compression level of the video data to be encoded, balancing the need for reduced data size with the preservation of video quality for vision tasks. Video data can be encoded using the codec parameters from block 506, and the encoding can include compressing the video and preparing it for transmission across a network to the server side 503, in accordance with aspects of the present invention.

II In some embodiments, in block 512, training can be executed, and during the training, a differentiable surrogate model of the standard codec can be employed. This model can enable the backpropagation of gradients from the server-side deep vision model to the Codec Control Network 504. The surrogate model ensures that the Codec Control Network 504 can be optimized using gradient-based learning, despite the standard video codec's non-differentiability. In block 510, encoded video can be transmitted over the network to the server side. The transmission process considers the current network bandwidth to avoid sending data at a rate that exceeds the network's capacity. Upon receipt by the server, the compressed video data can be decoded in block 514. The decoding process can include reconstructing the video data from its compressed form, making it available for analysis by a deep vision model.

In some embodiments, in block 516, the decoded video can be fed into a deep vision model, which can perform tasks including, for example, object detection, segmentation, classification, etc. based on content of the video. In block 518, the deep vision model can output predictions based on the analysis of the video data, and these predictions can represent the model's interpretation of the visual information contained in the video, in accordance with aspects of the present invention.

In various embodiments, the system and method 500 can perform video compression that accounts for requirements of deep vision models efficiently and effectively. It can ensure that the video data is not only efficiently compressed to meet network bandwidth constraints but also retains the necessary quality for accurate analysis by deep learning models. This process addresses the suboptimal compression of standard codecs for deep vision tasks by introducing a learnable control network that adapts codec parameters in real-time to dynamic conditions, thereby preserving the integrity of video data for downstream performance, in accordance with aspects of the present invention.

In some embodiments, block 506 is responsible for the application of the codec parameters, which is then followed by the encoding process in block 508. This process involves compressing the video using the H.264 codec, ensuring that the encoded video stream is within the boundaries set by the available network bandwidth while also retaining the necessary quality for subsequent analysis. The video codec, noted as block 510, can then facilitate the transition from the encoding process to decoding in block 514, where the video is reverted to a format suitable for analysis by the server-side model.

In various embodiments, block 512 illustrates the surrogate model, which is a differentiable representation of the H.264 codec, allowing for backpropagation of gradients from the server-side model through the codec during the learning phase. This model can be pivotal for refining the control network's predictive capabilities, in accordance with aspects of the present invention. In block 516, the server on the server-side model 503, which may include an action recognition model or a deep vision model, analyzes the decoded video. The performance of this analysis is benchmarked against the uncompressed video to ascertain that the compression has not detrimentally impacted the analytic outcomes. The final output of the system is shown in block 518, which is the prediction result produced by the server-side model after analyzing the video content. This output can be used for various purposes, such as activity recognition or other deep learning tasks, in accordance with aspects of the present invention.

In various embodiments control of the H. 264 codec can be learned by training a codec control network 504 to predict the optimal QP parameters for the current content and available bandwidth. We can learn the control network 504 by utilizing a simple end-to-end training formulation, facilitated by the H. 264 surrogate model. Note that while we demonstrate our general training pipeline on action recognition in this paper, the pipeline is agnostic to the type of task performed by the server-side model.

The codec control network 504 can predict the optimal QP-parameters, to be employed by the H. 264 codec, given a short video/clip and the current maximum available bandwidth. To facilitate real-world deployment, the present invention can utilize a very lightweight control network. For example, it can utilize X3D-S (or similar) as the backbone of our codec control network 504. In order to ensure the correct spatial shape of the output, the striding in the last stage of the X3D-S network can be omitted in some embodiments. To encode the bandwidth condition into the network's prediction, we can omit the classification head of the X3D-S model and utilize two residual blocks with CGN as the prediction head.

The prediction of the integer-valued QP parameters can be formalized as a classification problem. In particular, the control network can learn to predict a logit vector over the different QP values for each macroblock. During training, the Gumbel-Softmax trick can be used to produce a differentiable one-hot vector based on the predicted logits. During inference, the arg max can be used to generate the one-hot vector over QP values. When used as an input to the H. 264 codec (Equation (2)) and not to the surrogate model, the arg max function can be applied to the one-hot prediction, in accordance with aspects of the present invention.

In some embodiments, the control network 504 can be trained in an end-to-end setting on the control requirements. By utilizing the H. 264 surrogate model, the bandwidth can be directly minimized until the dynamic bandwidth requirement is met. Our control network 504 also takes direct feedback from the server-side model 516 by propagating gradients from the output of the server-side model 516 through the video codec surrogate model to the control network. Formally, the control network 504 can be trained to minimize:

$$\mathcal{L}_c = \alpha_p \mathcal{L}_p + \alpha_b \mathcal{L}_b$$

This control network loss $\mathcal{L}_c$ is composed of a performance loss $\mathcal{L}_p$ and a bandwidth loss $\mathcal{L}_b$. $\alpha_p$ and $\alpha_b$ are the respective positive loss weight factors. The performance loss is used to ensure that the performance of the server-side model is maintained. In the case of action recognition, we employ the Kullback-Leibler divergence $$\sum_{i=1}^{C} y_i \log \frac{y_i}{\tilde{y}_i}$$

between the action recognition prediction of the compressed video $\tilde{y} \in \mathbb{R}^c$ and the prediction of the uncompressed video $y \in \mathbb{R}^c$. We also refer to y as the pseudo label. Note that using a different server-side model 516 (e.g., an object detection model) can involve adapting the performance loss $\mathcal{L}_p$ to the new task.

In various embodiments, he bandwidth loss $\mathcal{L}_b$ ensures that the bandwidth required to transfer the video is minimized until the bandwidth condition is met. Formally, minimize $\mathcal{L}_B = \max(0, \tilde{b} - b(1-\epsilon))$, where b is the maximum available bandwidth (bandwidth condition). $\tilde{b}$ denotes the estimated bandwidth based on the surrogate models file size prediction $\tilde{f}$. We convert the file size (in B) to the bandwidth (in bit/s), with known frame rate (fps), number of video frames T, and the temporal stride $\Delta t$, by $$\tilde{b} = \frac{8\tilde{f}ps}{T\Delta t}.$$

We use a small $\epsilon$ in order to enforce the generated bandwidth to be smaller than the available bandwidth.

In some embodiments, both the control network 504 and the surrogate model 512 can be trained in an alternating fashion. However, in order to ensure stable training of the control network from the beginning, the surrogate model 512 can be pre-trained before fine-tuning it in the control network training. The control network's training is depicted in pseudocode in Algorithm 1, below:

| Algorithm 1 Pseudocode of our end-to-end control training in a PyTorch-like style. |
| --- |

```
1   for video, bw_max in data_loader:
2       # Forward pass control network
3       qp_one_hot = control_network(video, bw_max)
4
5       # Forward pass of surrogate model
6       video_s, fs_s = h264_surrogate(video, qp_one_hot)
7
8       # Prediction on transcoded video
9       pred = act_rec_model(video_s)
10
11      # Generate pseudo label with uncompressed video
12      with no_grad( ):
13          label_pseudo = act_rec_model(video)
14
15      # Convert file sizes to bandwidths
16      bw_s = file_size_to_bandwidth(fs_s)
17
18      # Compute loss (Eq. (7))
19      loss = alpha_b * loss_b(bw_s, bw_max) \
20             + alpha_p * loss_p(pred, label_pseudo)
21
22      # Compute backward pass and perform optimization
23      loss.backward( )
24      optimizer_control_network.step( )
25      # Next: Make surrogate model training step
```

In various embodiments, two metrics can be utilized to validate the codec control. The bandwidth condition accuracy ($acc_b$) measures how well our control meets the bandwidth condition. The performance accuracy ($acc_p$), computed between the arg max of the pseudo label y and the codec control prediction $\tilde{y}$ for a given bandwidth condition. Note for simplicity we do not consider frame dropping or other realworld behavior of a dynamic network when exceeding the bandwidth limit while computing $acc_p$. Following common practice, we can compute both the top-1 and top-5 performance accuracy, noting that the H. 264 codec itself is used for validation, and not the surrogate model, in accordance with aspects of the present invention.

Figure 6:
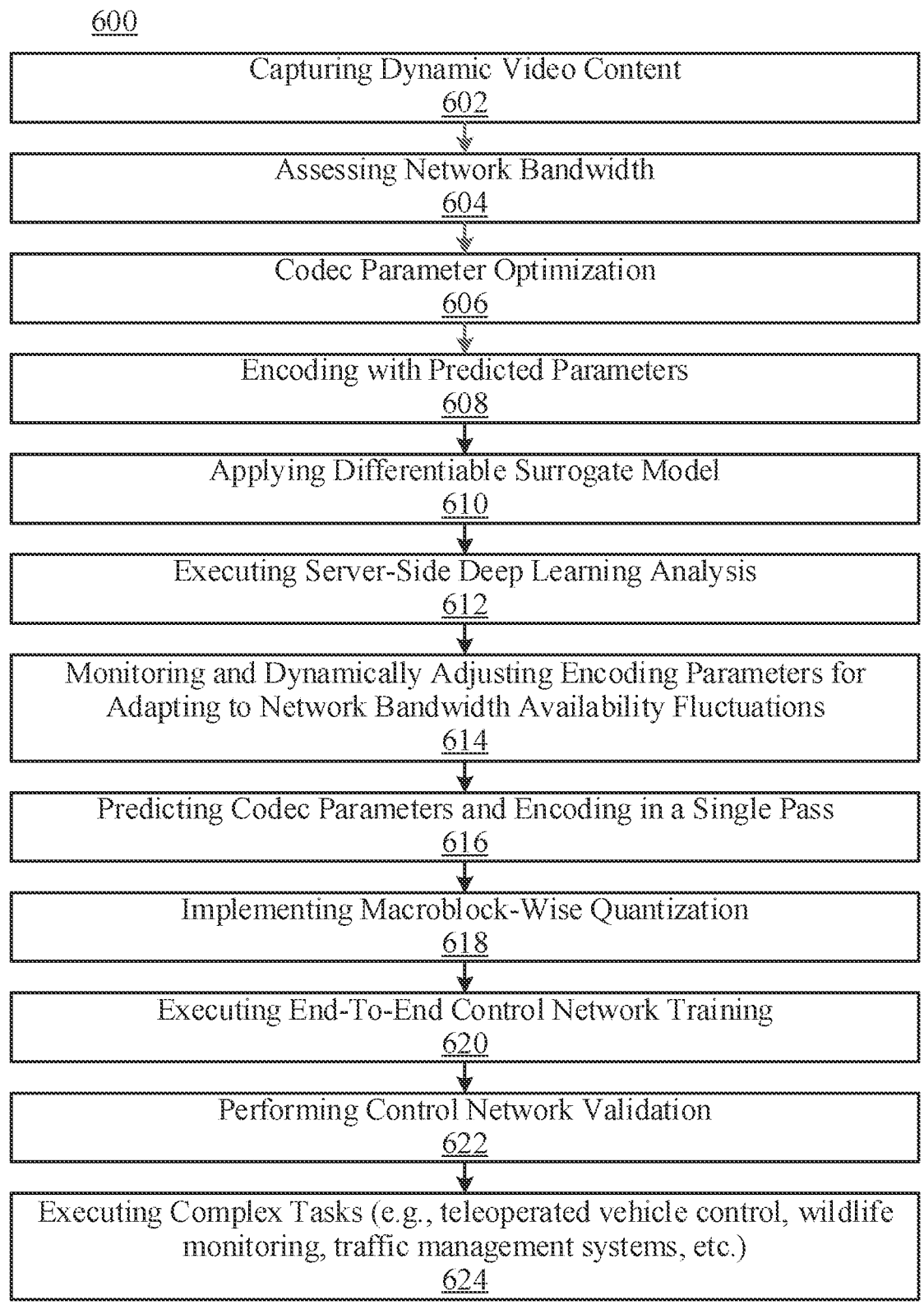
FIG. 6 is a block/flow diagram illustratively depicting a method for optimizing video compression control using deep learning models under varying network conditions, in accordance with embodiments of the present invention.

Referring now to FIG. 6, a block/flow diagram showing a method 600 for optimizing video processing and compression control using deep learning models under varying network conditions, is illustratively depicted in accordance with embodiments of the present invention.

In some embodiments, in block 602, dynamic video content capture can be performed by utilizing a camera system to capture dynamic video content. The process is intricately designed to cater to the nuanced requirements of downstream deep learning models. The captured content, rich in detail and variety, is set to undergo a series of sophisticated compression algorithms aimed at preserving the integrity and analytic utility of the video data. The content's intrinsic characteristics such as motion vectors, frame rate, resolution, and color depth are meticulously preserved to maintain high fidelity to the original scene. In block 604, network bandwidth assessment can include a thorough assessment of the prevailing network conditions, particularly the available bandwidth for video data transmission. This step is critical for the adaptive compression algorithm, which tailors the video stream's bitrate to the fluctuating network capacity. The assessment entails real-time monitoring and prediction algorithms that consider historical data trends, current network traffic, and predictive analytics to set a dynamic target bandwidth threshold. This threshold serves as a pivotal reference for the compression parameter adjustments that follow.

In block 606, codec parameter optimization can be performed using a control network, leveraging advanced machine learning techniques, to undertake the task of predicting the most optimal set of H.264 codec parameters. These parameters are meticulously chosen to strike an equilibrium between the twin objectives of minimizing bandwidth consumption and maximizing the performance of deep learning-based video analytics models. The control network employs complex optimization algorithms, considering the content's characteristics and the assessed network bandwidth, to predict quantization parameters that will yield an encoded video stream of the highest analytical value.

In block 608, encoding with predicted parameters can be executed. In this phase, the video content is encoded using the H.264 codec, which now operates with the fine-tuned quantization parameters prescribed by the control network. This step ensures that the video stream is compressed in such a manner that it does not surpass the network bandwidth limitations. The encoding process is a sophisticated blend of temporal and spatial compression techniques, including intra-frame and inter-frame predictions, transform coding, and entropy encoding, all adjusted to work within the parameters set to ensure optimal bandwidth utilization without sacrificing video quality.

In block 610, a differentiable surrogate model of the H.264 codec is deployed, which enables a differentiable pathway through the video encoding and decoding processes. This model is integral to the training and refinement of the control network, as it allows for the backpropagation of gradients from the server-side analytics model. The surrogate model is a novel construct that mirrors the codec's functionality while allowing for the mathematical differentiation that standard codecs do not support. This surrogate model can represent a pivotal innovation that links video compression to analytical performance in an unprecedented manner, in accordance with aspects of the present invention.

In block 612, server-side deep learning analysis can be performed by subjecting the compressed video to a comprehensive analysis by a server-side deep learning vision model. This model, which is benchmarked against uncompressed video to validate the compression's impact, utilizes convolutional neural networks, recurrent neural networks, or other suitable architectures to extract actionable insights from the video data. The analysis focuses on a range of attributes from object detection and classification to more complex tasks such as behavior prediction and anomaly detection, ensuring that the compression process retains sufficient quality for these advanced analytical operations.

In block 614, encoding parameters for adapting to network bandwidth availability fluctuations can be monitored and dynamically adjusted. In block 614, bandwidth constraint compliance can ensure rigorous compliance with the set bandwidth constraints during video streaming. This can be achieved through real-time monitoring systems that dynamically adjust encoding parameters to adapt to any fluctuations in network bandwidth availability. The objective is to transmit every bit of information without loss, preventing the dropping of critical data that could impact the analytics model's performance.

In block 616, codec parameter prediction and encoding can be executed in a single forward pass, avoiding the traditional complexities associated with feedback loops or multi-pass encoding strategies. This innovation streamlines the compression pipeline, significantly reducing latency, and computational overhead, thereby facilitating a more efficient and agile encoding process suitable for real-time applications. In block 618, macroblock-wise Quantization can be implemented. This is a technique that allows for differential compression across various regions of each video frame. The quantization process is content-aware, assigning varying levels of compression based on the importance of each macroblock to the overall video analytics goals. This nuanced approach ensures that critical regions of the frame are preserved with higher fidelity, while less important areas are compressed more aggressively to save bandwidth, in accordance with aspects of the present invention.

In block 620, end-to-end control network training can be executed, and the control network can be trained from the ground up, leveraging the capabilities of the differentiable surrogate model. This training is designed to directly align with the overarching goals of the system, which include maintaining the performance of maintaining server-side model performance and ensuring efficient utilization of available bandwidth. The training involves simulating various network conditions and content types to create a robust model capable of handling real-world streaming scenarios.

In block 622, control network validation can be performed, and can include conducting a rigorous validation process on the control network, utilizing metrics designed to measure the network's adherence to bandwidth conditions and the maintenance of deep learning model performance. This validation ensures the network's predictions are not only theoretically sound but also are practically effective in managing bandwidth without compromising the analytical utility of the video content. In block 624, complex tasks (e.g., traffic management, wildlife monitoring and conservation, etc.) can be executed by applying the codec control method, demonstrating the control network's versatility and adaptability. This application signifies the method's efficacy in not only traditional video analytics scenarios but also in dynamic and latency-sensitive environments, where maintaining high-quality video streams within strict bandwidth constraints is paramount, in accordance with aspects of the present invention.

Figure 7:
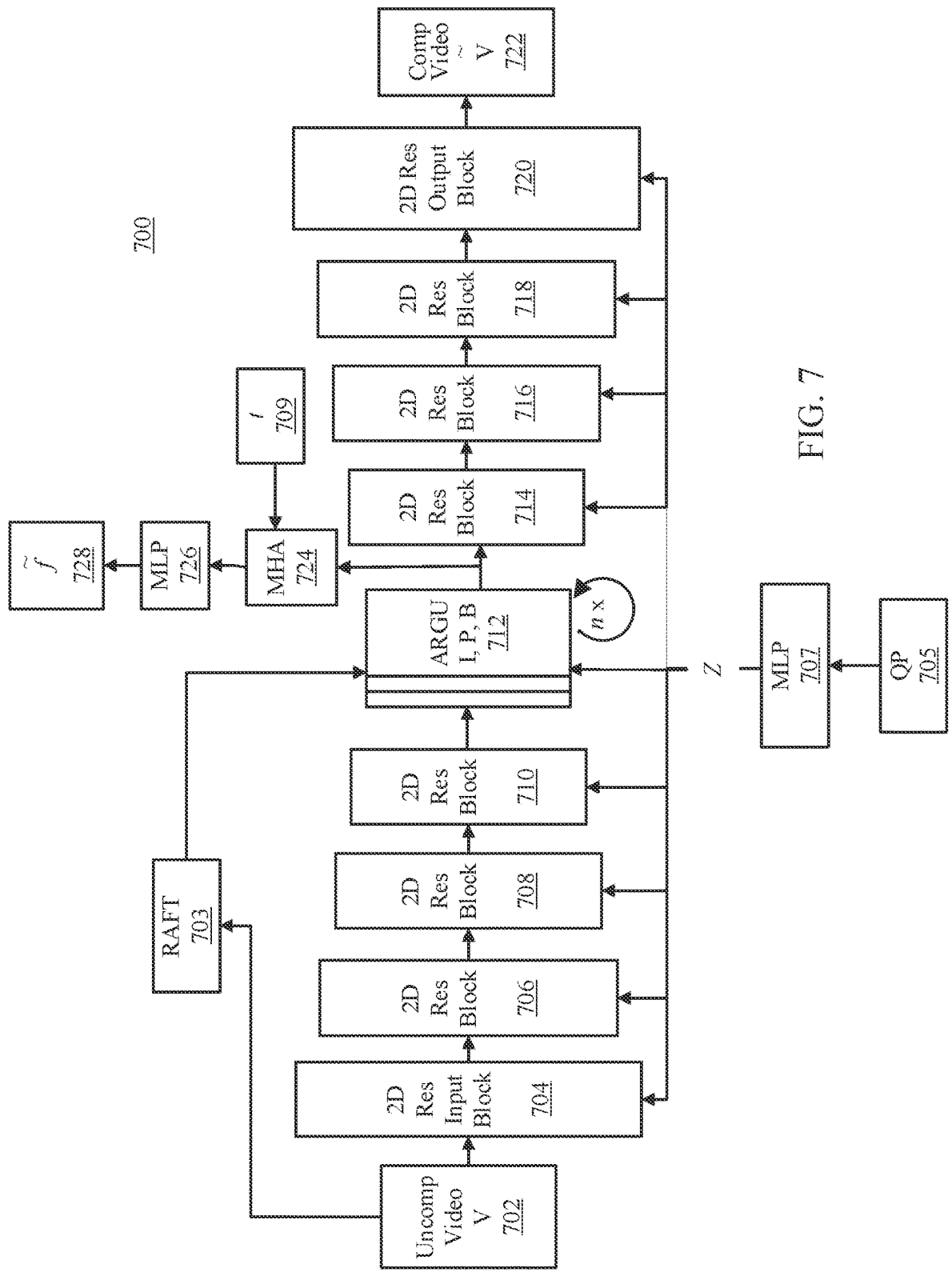
FIG. 7 is a diagram illustratively depicting a system and method for adaptive video compression using a surrogate model architecture for optimizing video encoding parameters in real-time using machine learning, in accordance with embodiments of the present invention.

Referring now to FIG. 7, a diagram showing an adaptive video compression system and method 700, including a surrogate model architecture for optimizing video encoding parameters in real-time using machine learning, is illustratively depicted in accordance with embodiments of the present invention. In various embodiments, the architecture can effectively learn and control macroblock-wise quantization parameters (QP) for video compression, enabling a differentiable approximation of the H.264 codec, thus facilitating end-to-end learning for video distortion versus file size trade-off control.

In some embodiments, the model can take uncompressed video (V) 702 as input and processes it through a series of 2D Residual (Res) Blocks 704, 706, 708, and 710. These blocks are designed for encoding video frames into feature embeddings at the frame level, capturing spatial dependencies. Each 2D Res Block is a convolutional unit that applies learned filters to the input, contributing to the surrogate model's ability to approximate the original video V.

In various embodiments, in block 702, an uncompressed video stream (V) can be received, which may include a series of frames that the system is to encode and compress. This raw video can serve as the foundational material from which the model extracts and condenses crucial visual information for efficient transmission or storage. The importance of this block lies in its provision of high-quality original content that can be precisely manipulated during the compression to maintain the integrity of essential data. In block 704, a 2D Resolution Input Block can receive and process the initial resolution processing of the raw video. This block can utilize spatial downsampling techniques to reduce the resolution of the video frames, thereby diminishing the data volume while retaining pivotal visual information necessary for the subsequent compression stages, in accordance with aspects of the present invention.

In various embodiments, blocks 706, 708, and 710 can represent sequential 2D resolution blocks, which can sequentially process the downsampled video frames. These blocks can apply convolutional operations to refine and emphasize the spatial features within the frames. This can safeguard the preservation of vital information within the frames to set the stage for effective compression in the bottleneck stage. Block 712, referring to an Aligned Convolutional Gated Recurrent Unit (AGRU) Blocks for I, P, B Frames, can process various frame types, capturing temporal interactions and dependencies. These blocks can leverage information from a Recurrent All-Pairs Field Transforms (RAFT) model in block 703 to align frames, thereby enabling the system to predict motion and alterations across the video sequence efficiently.

In block 703, the RAFT (Optical Flow Model), can furnish the system with predictions of optical flow, which elucidates the pattern of apparent motion of objects within the video frames. This information can be utilized for the AGRU blocks 712 to align the temporal processing used to compress P- and B-frames accurately in each AGRU iteration, which can be utilized for motion prediction and efficient compression.

In some embodiments, blocks 714, 716, and 718, represent 2D Resolution Blocks Post-AGRU Processing, which can further refine the encoded features following AGRU processing in block 712. This part of the process can include upscaling and additional filtering to enhance the spatial resolution, preparing the frames for the concluding output stage. In block 720, the 2D Resolution Output Block can return the frames to their initial resolution following the compressive transformations. The output block ensures that the reconstructed frames are primed for delivery as a compressed video stream, balancing the need for a reduced file size with the demand for high-quality reconstruction. Block 722, representing the Compressed Video Output (V), can be the culmination of the surrogate model, offering a compressed video output optimized for both file size and the retention of vital visual features for analytic tasks. It is primed for streaming or storage, adhering to the specified bandwidth constraints, in accordance with aspects of the present invention.

In some embodiments, block 705, representing Quantization Parameters (QP), can guide the degree of compression applied to different regions within the video frames. These parameters can offer detailed control over the compression process, enabling the model to apply varying compression ratios based on the significance of different areas within the frames. In block 707, the Multilayer Perceptron (MLP) for QP Embedding, can transform the quantization parameters into a latent vector space, facilitating their integration into the model's normalization layers. This embedding can allow the model to dynamically adjust its processing based on the desired level of compression, as indicated by the QP values.

In some embodiments, in block 724, the Multi-Head Attention (MHA) File Size Prediction Head can utilize a multi-head attention mechanism to predict the encoded video's file size on a per-frame basis. It can process the AGRU blocks' output features, executing a cross-attention function that allows the system to assess each frame type's contribution to the overall file size. In block 709, a Frame Token (t), can function as a unique identifier within the MHA block 724, signifying each frame's temporal position and type. This token can be utilized for enabling the MHA mechanism 724 to accurately link specific frames with their corresponding feature representations and file size predictions.

In block 726, an additional Multilayer Perceptron (MLP) for Feature Processing can be utilized to enhance the features from the AGRU blocks, boosting their representation for more accurate file size prediction by the MHA block. This step is utilized to ensure that the compression is optimized, reflecting a profound understanding of the video content and its features. Block 728 can include minimizing the difference between f and $\hat{f}$, and this process can be conducted in the logarithmic space due to the wide range of potential file sizes. This step can be a part of the self-supervised deep video codec control which aims to learn a deep codec control, solving a constrained optimization problem that ensures downstream performance is preserved while adhering to target network bandwidth limitations. Block 728, which depicts the predicted file size and $\hat{f}$, can be crucial to the self-supervised deep video codec control system and can interact with multiple components within the architecture.

In various embodiments, the frame token t can represent the temporal position and type of each frame within the multi-head attention (MHA) mechanism 724. It plays a role in enabling the MHA to perform cross-attention functions accurately, which in turn, influences the predicted file size $\hat{f}$ by estimating the contribution of each frame to the overall file size. The MHA block 724 can use the output features of the Aligned Convolutional Gated Recurrent Unit (AGRU) blocks 712 to predict the file size on a per-frame basis. This block's output, which includes the predicted file size $\hat{f}$, can be a direct input to Block 728. The accuracy of the MHA's file size prediction can directly impact the system's ability to optimize the video compression parameters to meet bandwidth constraints while preserving video quality for analytic tasks. The MLP of block 726 can enhance the feature representations from the AGRU blocks 712 before they are processed by the MHA block 724. The refined features can provide a more accurate file size prediction by the MHA 724, feeding into Block 728 and affecting the predicted file size $\hat{f}$. The predicted file size $\hat{f}$ in Block 728 is an important outcome of the system's predictive capabilities. It can enable the deep codec control network to adjust codec parameters to optimize video compression in line with the dynamic network conditions and the requirements of the downstream vision tasks. The interaction of block 728 with blocks 709, 724, and 726 reflects a tightly coupled system where temporal frame information, attention-based size prediction, and enhanced feature processing all converge to inform the critical task of file size prediction, which in turn influences bandwidth utilization and video quality, in accordance with aspects of the present invention.

In various embodiments, the H.264 surrogate model architecture of FIG. 7 can provide improved computational and memory efficiency as can include inductive biases from the original H.264 coding function. The present invention can include an encoder-decoder architecture with a bottleneck stage. For computational efficiency, we constrain the encoder and decoder to the frame level. To learn temporal interactions, the present invention can utilize an aligned convolutional gated recurrent unit (AGRU) for each frame type (I-, P-, and B-frame). By using the optical flow prediction of a pre-trained (small) RAFT model, frames used to compress P- and B-frames can be aligned in each AGRU iteration. Based on the output features of the AGRU the file size can be regressed on a per-frame level, and the file size head can utilize a multi-head attention layer to perform cross-attention between learnable query tokens and the AGRU output features. Individual tokens for each frame type can be utilized and the query tokens can be repeated for each frame. To condition both the encoder, decoder, and bottleneck block on QP we use a multilayer perceptron (MLP) to embed QP into a latent vector $z \in \mathbb{R}^{C_z \times T \times H/16 \times W/16}$.

In various embodiments, to incorporate z into the surrogate the present invention can utilize conditional group normalization (CGN). The CGN layer combines a spatial feature transform layer followed by a standard group normalization layer without learnable parameters. Note the surrogate model of the present invention can utilize one-hot encoded quantization parameters, denoted as $qp \in [0, 1]^{52 \times T \times H/16 \times W/16}$, which can enable the later formulation of the prediction of the integer-valued QP as a classification problem. Our resulting surrogate model architecture is fully differentiable with respect to both the input video clip V and qp, in accordance with aspects of the present invention.

In various embodiments, the H. 264 video codec may be not differentiable due to discreet operations (non-differentiable) and quantizations (gradient zero or undefined). To enable a gradient flow from the server-side model and the generated bandwidth to the codec control network we present invention can build and utilize a conditional differentiable surrogate model of H.264. The H. 264 coding (encoding & decoding) can be considered as a continuous black-box function mapping the original (e.g., raw) video V conditioned on the macroblock-wise quantization parameters QP to the encoded and decoded video $\hat{V}$ as well as the encoded per-frame file size f as follows:

$$H.264(V, QP) = (\hat{V}, f), V, \hat{V} \in \mathbb{R}^{3 \times T \times H \times W},$$

$$QP \in \{0, ..., 51\}^{T \times H/16 \times W/16}, f \in \mathbb{R}_+^T$$

where T indicates the number of frames and H×W the spatial dimensions of the RGB video. Other H. 264 parameters are considered to be constant. In particular, in an exemplary illustrative embodiment, we can consider a GOP of 8 (thus, T=8) and a default preset.

In various embodiments, this surrogate model notably fulfills two tasks during the codec control training. First, it allows the codec control network to consume gradient-based feedback from the downstream model regarding its performance. Second, the codec control network can also get gradient-based feedback with respect to the generated and required bandwidth/file size through our differentiable file size prediction. In some embodiments, the surrogate model of the present invention can include an encoder-decoder architecture with a bottleneck stage. For computational efficiency, the encoder and decoder can be constrained to the frame level. To learn temporal interactions, we utilize an aligned convolutional gated recurrent unit (AGRU) for each frame type (I-, P-, and B-frame). By using the optical flow prediction of a pre-trained (e.g., small) RAFT model, we align frames used to compress P- and B-frames in each AGRU iteration. Based on the output features of the AGRU we regress the file size on a per-frame level. Our file size head utilizes a multi-head attention layer to perform cross-attention between learnable query tokens $t \in \mathbb{R}^{3 \times C_t}$ and the AGRU output features. The present invention can utilize individual tokens for each frame type and repeat the query tokens for each frame.

In various embodiments, taking inspiration from the motion compensated and GOP-based compression performed by H. 264 (and other standard codecs) the present invention can utilize AGRUs in the bottleneck stage of our surrogate model. Similar to the iterative refinement used in RAFT, the AGRU of the present invention can approximate H. 264 compression in an iterative fashion in latent space. Through an alignment in the latent space temporal interactions between the frame to be compressed and the reference frames are efficiently modeled. In particular, we utilize separate AGRUs for each frame type. The B-frame AGRU can be described by:

$$Z_{t+1} = \sigma(CGN(C_{3\times3}(H_t) + C_{3\times3}([\hat{A}_t, \tilde{A}_t]), z))$$

$$R_{t+1} = \sigma(GN(C_{1\times1}(H_t) + C_{1\times1}([\hat{A}_t, \tilde{A}_t])))$$

$$\bar{H}_{t+1} = \tanh(GN(C_{1\times1}(R_{t+1} \odot H_t) + C_{1\times1}([\hat{A}_t, \tilde{A}_t])))$$

$$H_{t+1} = (1 - Z_{t+1}) \odot H_t + Z_{t+1} \odot \bar{H}_{t+1},$$

where $C_{3\times3}$ and $C_{1\times1}$ denote a 3×3 and a 1×1 convolution, respectively. We do not share parameters between convolutions. $H_t$ are the latent features of the B-frame. $\hat{A}_t$ and $\tilde{A}_t$ represent the aligned previous and subsequent frame features used for compression based on the GOP structure. The features of the frames used for compression can be aligned by $\hat{A}_t = w(\hat{H}_t, \text{RAFT}(V_t, \hat{V}_t))$, and the unaligned features $\hat{H}_t$ can be backward warped ($w$) based on the optical flow between the frame to be compressed $V_i$ and the reference frame $\hat{V}_j$, using RAFT, in accordance with aspects of the present invention.

The optical flow can be downsampled to match the spatial dimension of the latent features. For P-frames, the present invention may utilize only one reference frame. In the case of an I-frame the conditioning in the AGRU may be fully omitted. Note the reference frames for B- and P-frame compression can be obtained by the known GOP structure. In various embodiments, the surrogate model of the present invention can approximate both the H. 264 function ($\hat{V} \approx \tilde{V}$, $f \approx \tilde{f}$) and its derivative $$\left( \frac{dV}{dQP} \approx \frac{d\hat{V}}{dqp}, \frac{df}{dqp} \approx \frac{d\tilde{f}}{dqp} \right).$$

Based on the control variates theory, the surrogate model can become a low-variance gradient estimator of the above equations if the difference between the output of the surrogate and the true H. 264 function is minimized and the two output distributions are maximizing the correlation coefficients ρ. The present invention can enforce both requirements for $\hat{V}$ and $\tilde{f}$ by minimizing $\mathcal{L}_s = \mathcal{L}_{s_v} + \mathcal{L}_{s_f}$ during training. $\mathcal{L}_{s_v}$ supervises the per-frame file size prediction and is defined as:

$$\mathcal{L}_{s_f} = \alpha_{\rho_f} \mathcal{L}_{\rho_f} + \alpha_{L1} \mathcal{L}_{L1}$$

where $\mathcal{L}_{\rho_f}$ is the correlation coefficient loss between the true file size $f$ and the predicted file size $\tilde{f}$. $\mathcal{L}_{L1}$ is used to minimize the distance between $f$ and $\tilde{f}$. Note that $\tilde{f}$ can be learned in $\log_{10}$-space due to the large range of file sizes. To learn the prediction of the coded video the present invention can minimize $\mathcal{L}_{s_v} = \alpha_{\rho_v} \mathcal{L}_{\rho_v} + \alpha_{SSIM} \mathcal{L}_{SSIM} + \alpha_{FF} \mathcal{L}_{FF}$, where $\mathcal{L}_{\rho_f}$ is the correlation coefficient loss for the coded video prediction. The distance between $\hat{V}$ and $\tilde{V}$ can be minimized both in pixel space and frequency space. In an illustrative embodiment, the present invention can use the structural similarity measure (SSIM) loss for minimizing the error in pixel space. Taking inspiration from the frequency-based compression utilized by H.264, the present invention can utilize the focal frequency loss, minimizing prediction error in the frequency space and a is used to denote the different regularization parameters, in accordance with aspects of the present invention.

In various embodiments, the present invention can include a control network, which can consume a video clip as well as a target bandwidth and predict the macroblock-wise QP. To facilitate the deployment on a standard edge device, (e.g., NVIDIA Jetson Nano), the present invention can utilize a very lightweight architecture. For example, in one embodiment, the present invention can utilize X3D-S as our control network. To input the bandwidth condition to the network the X3D classification head can be omitted, and two residual blocks with conditional normalization can be utilized for prediction. Due to the discreet nature of QP (e.g., integer-valued), the QP prediction can be formulated as a classification in which the control network learns to predict a logit vector over all possible QP values. During end-to-end training, the Gumbel SoftMax trick can be used to produce a differentiable one-hot vector qp based on the predicted logits. During inference, when used as an input to the original H. 264 codec and not to the surrogate model, the present invention applies the arg max function, in accordance with aspects of the present invention.

In various embodiments, the present invention can employ a self-supervised training strategy to train the deep codec control. To utilize end-to-end gradient-based learning constrained optimization problem can be reformulated as a continuous optimization task. In an exemplary embodiment, the control loss $\mathcal{L}_c$ can consist of three terms—bandwidth loss $\mathcal{L}_b$, a performance loss $\mathcal{L}_p$, and a bandwidth regularizer $\mathcal{L}_r$ as follows:

$$\mathcal{L}_c = \alpha_b \mathcal{L}_b + \alpha_p \mathcal{L}_p + \alpha_r \mathcal{L}_r,$$

where each individual loss can be weighted by a separate regularization parameter α. The bandwidth loss $\mathcal{L}_b$ can be used to enforce that the deep codec control satisfies the network bandwidth condition and is defined as:

$$\mathcal{L}_p = \max(0, \tilde{b} - b(1 - \epsilon_p)),$$

where b is the maximum available bandwidth (bandwidth condition), and $\tilde{b}$ denotes the bandwidth prediction computed based on the surrogate model file size prediction $\tilde{f}$. In some embodiments, the present invention can convert the per-frame file size (in B) to the bandwidth (in bit/s), with the known frame rate (fps), the number of video frames T, and the temporal stride Δt, by $$\tilde{b} = \frac{8 \sum_{i=1}^{T} \tilde{f}_i \cdot fps}{T \Delta t},$$

assuming a constant stream for the duration of the input clip. A comparatively small $\epsilon_B$ can be utilized in order to enforce the generated bandwidth just to be below the available bandwidth, in accordance with aspects of the present invention.

In various embodiments, the performance loss enforces the preservation of downstream vision performance. In the case of optical flow estimation, the present invention can use a scaled absolute error loss H $(b - \tilde{b}(1+\epsilon_p)) \|O - \tilde{O}\|_1$, where O denotes the optical flow prediction for the coded video clip and $\tilde{O}$ represents the optical flow prediction based on the raw video clip, used as a pseudo label. The present invention can scale the absolute error with a Heaviside function H, only considering the server-side model's performance if the target bandwidth is met with a small tolerance Ep. For semantic segmentation, the present invention can replace the absolute error with the Kullback-Leibler divergence, noting that using a different server-side model (e.g., an object detection model) can require adapting the performance loss $\mathcal{L}_p$ to the new task.

In various embodiments, during preliminary experiments, it can be observed that the control network can struggle to use the whole range of QP values. Motivated by this observation, the present invention can be configured to regularize the control network toward generating a bitrate close to the target by:

$$\mathcal{L}_r = |\min(0, \tilde{b} - b(1 - \epsilon_r))|.$$

This regularization loss can penalize the control network if the bandwidth prediction $\tilde{b}$ is far away from the target bandwidth b. The present invention can utilize $\epsilon_B < \epsilon_r$ to not push the generated bandwidth above the target bandwidth. The present invention can train both the deep codec control and surrogate in an alternating fashion. To ensure stable training of the control network from the beginning on, the present invention can include pre-training the surrogate model before fine-tuning it during the control training, in accordance with aspects of the present invention.

Figure 8:
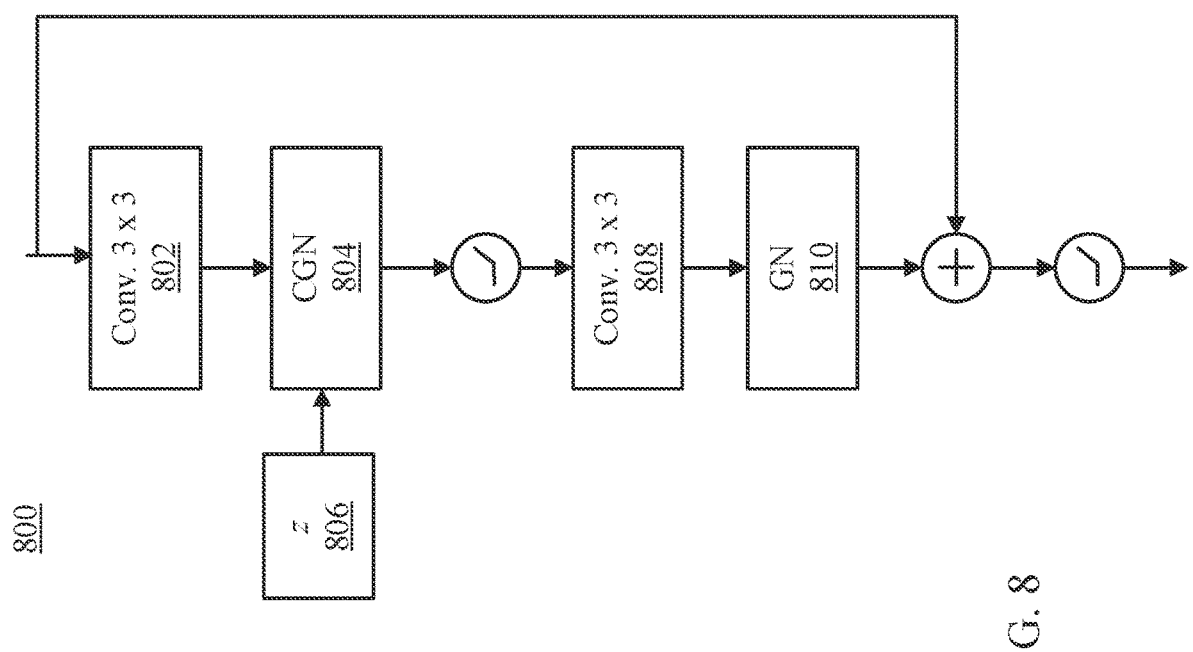
FIG. 8 is a diagram illustratively depicting a system and method for video processing and compression using a surrogate model block configuration including a detailed representation of an exemplary 2D residual block, in accordance with aspects of the present invention.

Referring now to FIG. 8, with continued reference to FIG. 7, a diagram showing a system and method 800 for video processing and compression using a surrogate model block configuration including a detailed representation of an exemplary 2D residual block 718, is illustratively depicted in accordance with embodiments of the present invention.

This is focused on the normalization and convolution processes, which are utilized for overall video compression.

In various embodiments, input can be received and processed in block 802 using a convolutional layer with a 3×3 kernel size, which can apply spatial filters to the input features to extract and transform spatial information. This layer can be utilized for capturing local visual patterns within the video frames. The Conditional Group Normalization (CGN) layer in block 804 can receive both the output from the preceding convolutional layer and a latent vector z from block 806. The CGN layer 804 can normalize the feature maps by using conditions encoded in z 806. This can enable the normalization process to be adaptive, modulating the feature maps in a way that reflects the desired quantization levels for different regions of the video frames, in accordance with aspects of the present invention. The latent vector z in block 806 can be generated by a multilayer perceptron (MLP) from the quantization parameters (QP). It captures important information about how different areas of the video frames should be quantized and compressed. By feeding this vector into the CGN layer, the model can ensure that the normalization process takes into account the varying importance of different regions within the frames, facilitating more efficient compression.

In some embodiments, in block 808, following the CGN, another 3×3 convolutional layer can process the normalized features. This layer may further refine the features, enhancing important information or suppressing noise, contributing to the effective compression of the video data.

In block 810, a Group Normalization (GN) layer can normalize the feature maps without the conditions encoded in "z". GN can be particularly useful for normalizing the data across groups of channels, contributing to the stabilization of the learning process and is advantageous when training with small batch sizes, which is often the case in video processing. It is noted that the angled line with a horizontal line through it, as seen connecting blocks 804 and 808, and blocks 808 and 810, is indicative of operations that combine the outputs of CGN and the subsequent convolution layers, and these symbols represent mathematical operations performed by the CGN in accordance with aspects of the present invention.

Figure 9:
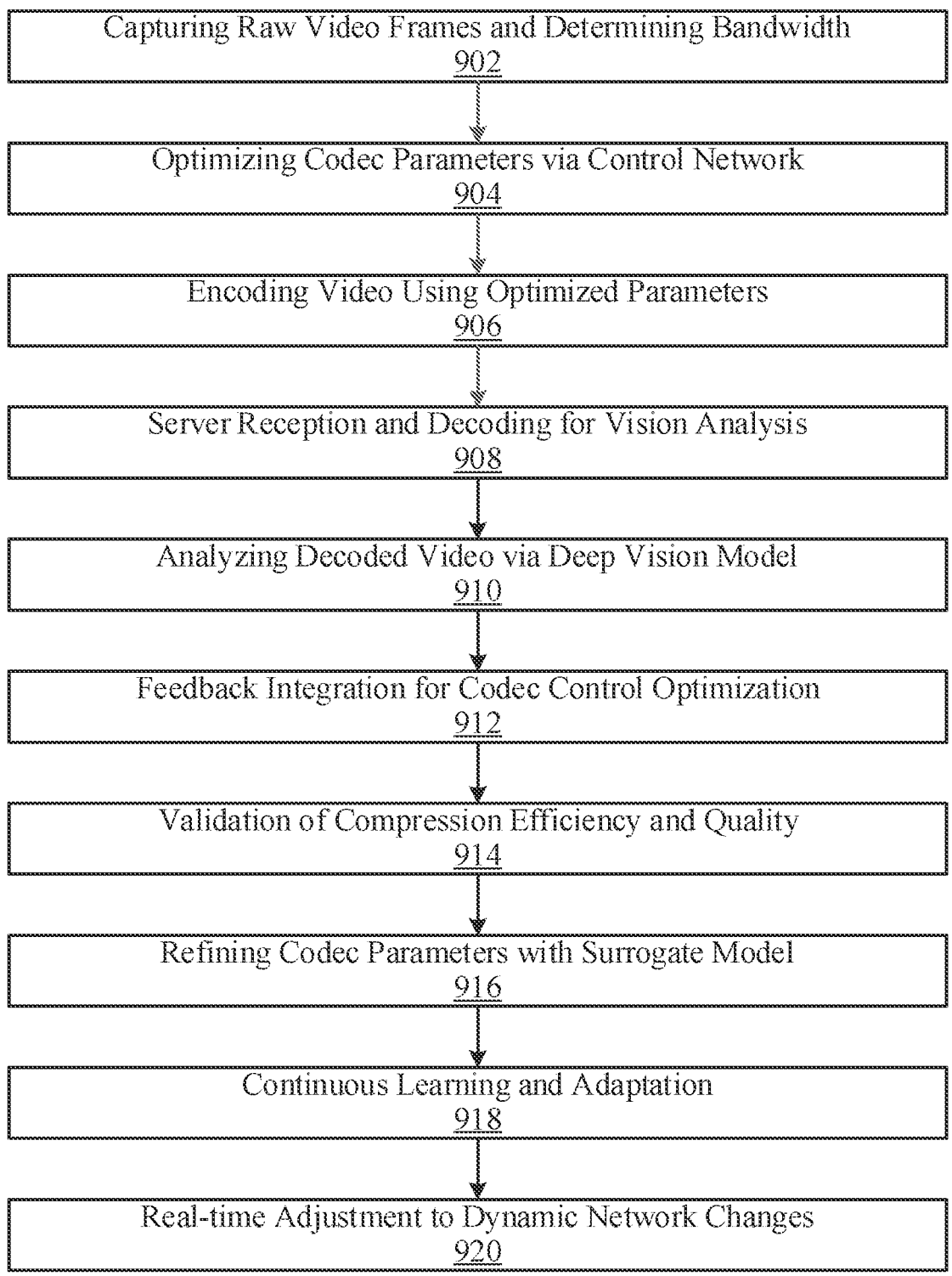
FIG. 9 is a block/flow diagram illustratively depicting a method for optimizing video processing and compression control using deep learning models under varying network conditions, in accordance with embodiments of the present invention.

Referring now to FIG. 9, a block/flow diagram illustratively depicting a method 900 for optimizing video processing and compression control using deep learning models under varying network conditions, is illustratively depicted in accordance with embodiments of the present invention.

In various embodiments, in block 902, In block 902, raw video frames can be captured through high-resolution cameras, which can be then passed to the Codec Control Network along with the bandwidth conditions. The bandwidth can be evaluated through advanced algorithms capable of analyzing current network usage and predicting near-future bandwidth availability, ensuring that the video streaming adapts to fluctuating network conditions, in accordance with aspects of the present invention. Block 904 involves a Codec Control Network that can predict codec parameters, such as quantization levels, based on the video content and bandwidth constraints. This prediction can be utilized for adjusting the compression to preserve the essential features of the video that are important for deep vision tasks while staying within the bandwidth limits.

In block 906, the raw video data undergoes encoding with the optimized parameters. The Codec Control Network's predictions are applied to compress the video efficiently, focusing on maintaining high quality for regions of interest while minimizing data size to fit the network bandwidth.

Block 908 illustrates the server's role in receiving the compressed video. Here, the encoded video can be decoded to reconstruct the frames for analysis. This step is important for the deep vision model to accurately process the video data, which will involve complex analytics such as object detection or scene segmentation. In block 910, the server's deep vision model can analyze the decoded video. This model, equipped with advanced deep learning algorithms, performs vision tasks on the video frames, extracting valuable insights according to the defined objectives, such as recognizing objects or understanding scene dynamics, in accordance with aspects of the present invention.

In various embodiments, block 912 illustrates a feedback loop where the performance metrics from the vision model's analysis can be used to fine-tune the Codec Control Network. This self-supervised learning step is important for improving the codec control based on actual vision model performance, leading to more accurate parameter predictions over time. In block 914, the system can validate the compression efficiency and the quality of the video post-compression. This validation step is important to ensure that the vision model's performance remains high and that the bandwidth constraints are being met. Block 916 demonstrates the use of a differentiable surrogate model of the H.264 codec during training to refine codec parameters. This model allows for gradient-based optimization of the Codec Control Network by providing a differentiable path through which feedback can flow.

In block 918, the system can enter a phase of continuous learning and adaptation. The Codec Control Network can regularly update its parameters based on ongoing feedback and validation results, ensuring that the video compression remains optimal for both network conditions and deep vision model performance. In block 920, the present invention can adjust in real-time to dynamic network changes. The Codec Control Network can actively monitor network conditions and adjust codec parameters during use in real-time, ensuring smooth video streaming and consistent vision model performance, in accordance with aspects of the present invention.

Figure 10:
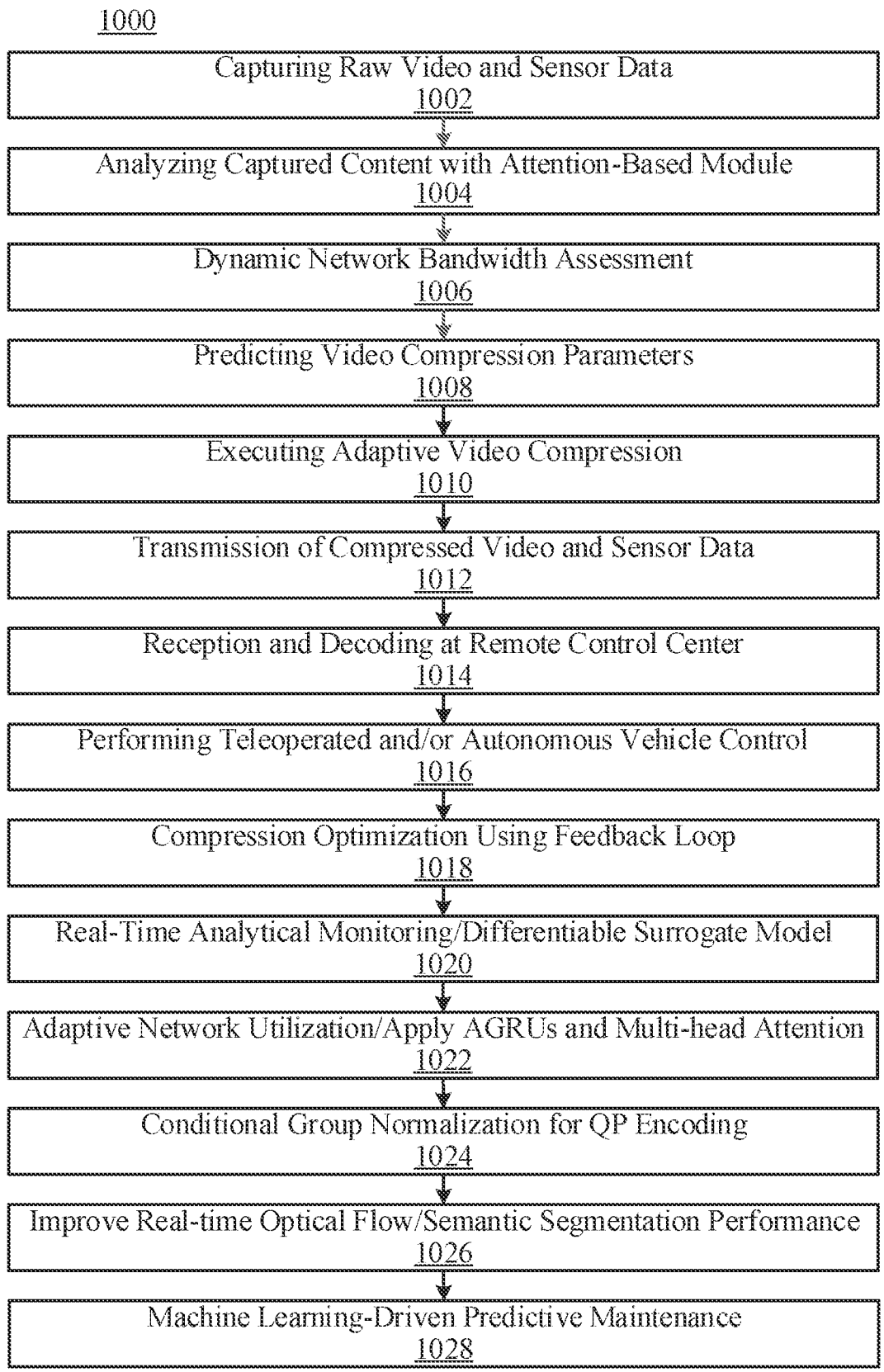
FIG. 10 is a block/flow diagram illustratively depicting a method for teleoperated vehicle control, including optimizing video processing and compression control in real-time using deep learning models under varying network conditions, in accordance with embodiments of the present invention.

Referring now to FIG. 10, a diagram showing a method 1000 for optimizing end-to-end video compression control using deep learning models under varying network conditions, is illustratively depicted in accordance with embodiments of the present invention.

In various embodiments, in block 1002, raw video frames and sensor data can be captured by a plurality of sensors and cameras deployed on a vehicle configured for teleoperated and/or autonomous vehicle control, deployed strategically around the vehicle to capture a 360-degree view and other critical information utilized for teleoperated and/or automated remote driving. These sensors can include, but are not limited to, LiDAR for distance measurement, radar sensors for velocity detection, GPS for precise location tracking, and IMUs (Inertial Measurement Units) for capturing vehicle orientation and acceleration. This comprehensive sensor array ensures that the remote operator has access to all necessary data to make informed driving decisions. The video and sensor data capture process can be optimized to ensure real-time data acquisition and processing, facilitating immediate response to changing driving conditions, in accordance with aspects of the present invention.

In block 1004, content analysis with an attention-based module can include processing captured video frames to identify critical regions that are essential for making informed driving decisions, such as road signs, pedestrians, and other vehicles. This module leverages advanced computer vision techniques and deep learning models to analyze the content of video frames, dynamically distinguishing between regions of varying importance based on the current driving context. By focusing on these critical regions, the system ensures that the video compression process preserves high fidelity in areas that directly impact the safety and efficiency of teleoperated driving. In block 1006, dynamic network bandwidth assessment can include continuously monitoring the current network bandwidth available for data transmission, employing sophisticated algorithms to predict network fluctuations. This proactive approach allows the system to anticipate changes in network conditions, enabling adaptive video compression that ensures consistent video quality even under constrained bandwidth scenarios. This feature is important for maintaining a reliable connection between the teleoperated vehicle and the remote operator, ensuring that all sensor and video data are transmitted without significant delay or loss.

In block 1008, leveraging a differentiable analytics model, the present invention can predict optimal video compression parameters that balance the need for high-quality video transmission with the constraints of available network bandwidth. This prediction process considers both the content importance, as identified by the attention-based module, and the dynamic network conditions, ensuring that the compression parameters are tailored to maintain the integrity of critical video information while adapting to bandwidth limitations. The use of a differentiable model enables continuous learning and improvement of the parameter prediction process based on real-world feedback.

In block 1010, with the optimal compression parameters determined, the video stream is adaptively compressed, prioritizing the retention of high-quality imagery in regions identified as critical while efficiently compressing less important areas to conserve bandwidth. This adaptive compression mechanism is important for delivering video data that supports accurate remote driving decisions, ensuring that the remote operator receives clear and detailed visual information where it matters most, despite bandwidth constraints. In block 1012, compressed video alongside the sensor data can be transmitted to the remote-control center using the most efficient network protocols to minimize latency and maximize data integrity. The system's intelligent bandwidth management ensures that the data transmission is optimized based on the current network conditions, preventing data loss or significant delays that could impact the remote driving experience.

In block 1014, data can be received and decoded at a remote-control center, and upon receipt, the compressed video and sensor data can be promptly decoded and processed in real-time at the remote-control center. This process can reconstruct the video stream to its near-original quality, ensuring that the remote operator has access to clear and accurate visual and sensor information for making driving decisions. The rapid decoding process is important for minimizing latency between data reception and action by the remote operator, enabling real-time teleoperated driving. In block 1016, a remote operator can control a vehicle based on a generated analysis of the decoded video and sensor data, and sending driving commands back to the vehicle in real-time. These commands can include, for example, steering adjustments, speed control, navigation commands, etc., which can be all based on the comprehensive understanding of the vehicle's immediate environment provided by the processed video and sensor data. This block is important for the teleoperated driving system, where the effectiveness of the video compression and transmission process is utilized for providing safe and efficient teleoperated remote vehicle operation, in accordance with aspects of the present invention.

In various embodiments, in block 1018, compression optimization using a feedback loop can be performed. The instructions further enable the adjustment of the predictive model based on discrepancies between expected and actual outcomes of teleoperated driving maneuvers. This enhances the system's adaptability and performance by incorporating real-world driving feedback into the video compression parameter optimization process. The feedback mechanism is important for ensuring that the video compression technique remains aligned with the dynamic requirements of teleoperated driving, continuously improving the quality of video transmission and the effectiveness of remote vehicle control.

In block 1020, the present invention can continuously monitor the performance of the teleoperated vehicle in real-time, including assessing the efficiency of data transmission, the quality of video received by the remote operator, and the responsiveness of the vehicle to remote commands. This monitoring helps identify any potential issues in the teleoperation system, such as latency or data packet loss, which can affect driving performance, in accordance with aspects of the present invention. Block 1020 can further include integration of a conditional differentiable surrogate model to enable end-to-end learning and optimization of the codec control, allowing for fine-grained adjustment of compression parameters based on network bandwidth and downstream task performance.

In block 1022, based on real-time analytical monitoring, the system can dynamically adjust the utilization of the network resources to optimize video transmission. This may include switching between network channels, adjusting the bitrate of the video stream, or employing network redundancy techniques to ensure consistent video quality and reliable vehicle control, even in challenging network conditions. Block 1022 can further include application of AGRUs and Multi-head Attention (MHA) for compression, in which Advanced Gated Recurrent Units (AGRUs) can be used for efficient modeling of temporal interactions in the video compression process, coupled with a multi-head attention mechanism for precise file size prediction and optimization of video quality for each frame type. In block 1024, to protect the integrity and confidentiality of the transmitted video and sensor data, the system implements enhanced security measures. This includes encrypting data streams, securing communication channels, and employing robust authentication mechanisms for the remote operator and the teleoperated vehicle system, ensuring that only authorized personnel can control the vehicle. Block 1024 can further include implementing Conditional Group Normalization (CGN) within the surrogate model architecture, the system dynamically encodes the information of quantization parameters (QP), enhancing the adaptability and effectiveness of video compression based on real-time conditions.

In block 1026, a teleoperation control interface can be customized according to the preferences and requirements of the remote operator. The system provides the operator with the ability to adjust the layout of the control interface, select preferred data visualization options, and provide feedback on the teleoperation experience. This customization enhances operator comfort and efficiency, leading to improved vehicle control and safety. Block 1026 can provide for real-time optical flow and semantic segmentation performance improvement, as demonstrated by significant improvements in downstream tasks like optical flow estimation and semantic segmentation, validating the effectiveness of the proposed deep codec control in maintaining high task performance under variable network conditions. In block 1028, the present invention can utilize machine learning algorithms to analyze sensor data and predict maintenance needs for the teleoperated vehicle. By identifying patterns that may indicate wear and tear or potential failures, the system can recommend preventive maintenance, reducing downtime and ensuring the vehicle remains in optimal condition for safe teleoperation, in accordance with aspects of the present invention.

Figure 11:
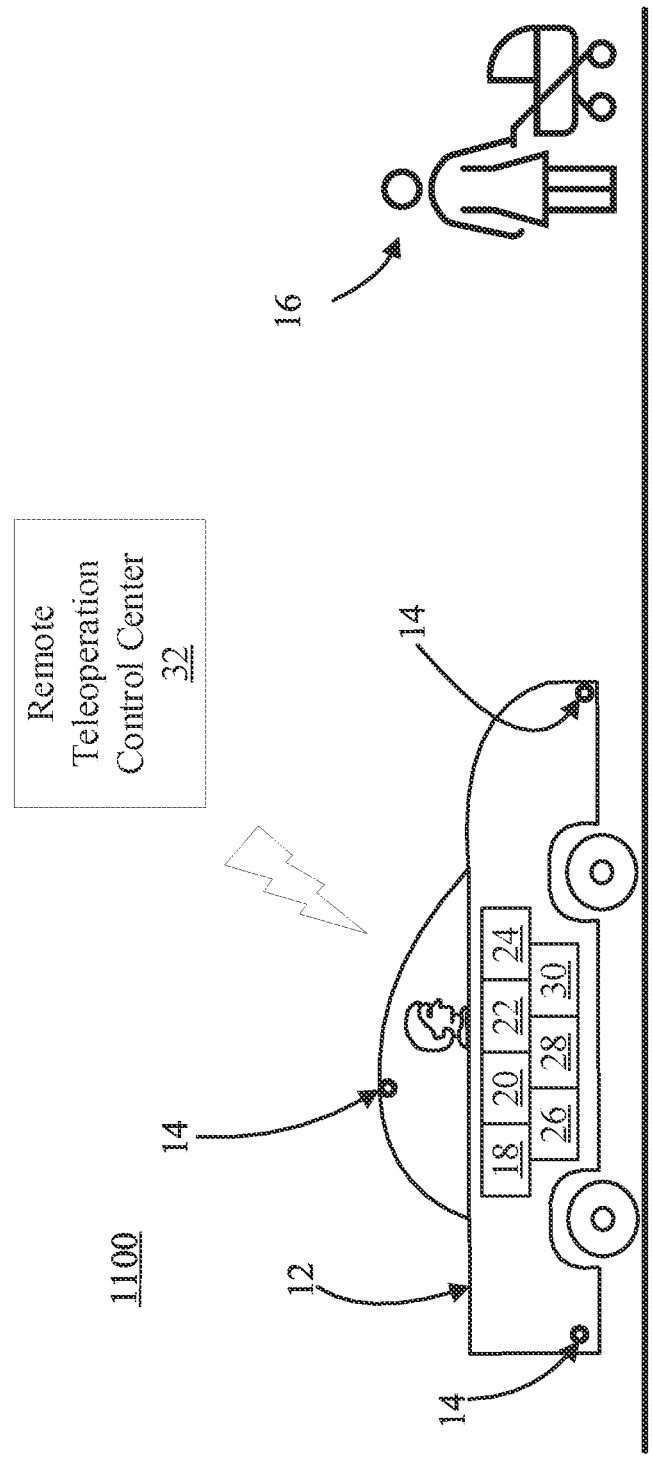
FIG. 11 is a diagram showing a system for teleoperated vehicle control, including optimizing video compression control using deep learning models under varying network conditions for remotely controlling functions of a vehicle based on an analysis of data from vehicle cameras and sensors, in accordance with embodiments of the present invention.

Referring now to FIG. 11, a diagram showing a system 1100 for teleoperated vehicle control, including optimizing video compression control using deep learning models under varying network conditions for remotely controlling functions of a vehicle based on an analysis of data from vehicle cameras and sensors, in accordance with embodiments of the present invention.

In various embodiments, the system 1100 can include a vehicle 12 configured for teleoperated and/or autonomous vehicle control. In one embodiment, the autonomous vehicle 12 can be an automobile. In other embodiments, the vehicle 12 can include a boat, plane, helicopter, truck, boat, etc. The vehicle 12 can include a propulsion system 18. For an airborne embodiment, the propulsion system 18 can include propellers or other engines for flying the vehicle 12. In another embodiment, the propulsion system 18 can include wheels or tracks. In another embodiment, the propulsion system 18 can include a jet engine or hover technology. The propulsion system 18 can include one or more motors, which can include an internal combustion engine, electric motor, etc.

The vehicle 12 can include a power source 20. The power source 20 can include or employ one or more batteries, liquid fuel (e.g., gasoline, alcohol, diesel, etc.) or other energy sources. In another embodiment, the power source 20 can include one or more solar cells or one or more fuel cells. In another embodiment, the power source 20 can include combustive gas (e.g., hydrogen).

The vehicle 12 can be equipped with computing functions and controls. The vehicle 12 can include a processor 22. The vehicle 12 can include a transceiver 24. In one embodiment, the transceiver 24 can be coupled to a global position system (GPS) to generate an alert of a position of the vehicle 12 relative to other vehicles in a common coordinate system. The transceiver 24 can be equipped to communicate with a cellular network system. In this way, the vehicle's position can be computed based on triangulation between cell towers based upon signal strength or the like. The transceiver 24 can include a WIFI or equivalent radio system. The processor 22, transceiver 24, and location information can be utilized in a guidance control system 26 for the vehicle 12.

The vehicle 12 can include memory storage 28. The memory storage 28 can include solid state or soft storage and work in conjunction with other systems on the vehicle 12 to record data, run algorithms or programs, control the vehicle, etc. The memory storage 28 can include a Read Only Memory (ROM), random access memory (RAM), or any other type of memory useful for the present applications.

The vehicle 12 can include one or more sensors 14 (e.g., cameras, proximity sensors, LIDAR, radar, GPS, etc.) for collecting data of a plurality of different data types before, during, and/or after utilization of the vehicle 12. The one or more sensors 14 can view the area surrounding the vehicle 12 to input sensor data into control network 30 for data processing and analysis and the guidance control system 26 of the vehicle 12. The one or more sensors 14 can detect objects around the vehicle 12, e.g., other vehicles, building, light poles, pedestrians 16, trees, etc., and/or internal vehicle functions and/or status of vehicle components. The data obtained by the one or more sensors 14 can be processed by the control network 30 of the autonomous vehicle 12 and can be utilized by the guidance control system 26 to, for example, receive commands from the remote teleoperation control center 32 to adjust the propulsion system 18 of the autonomous vehicle 12 to avoid objects around the autonomous vehicle 12, in accordance with various aspects of the present invention.

Figure 12:
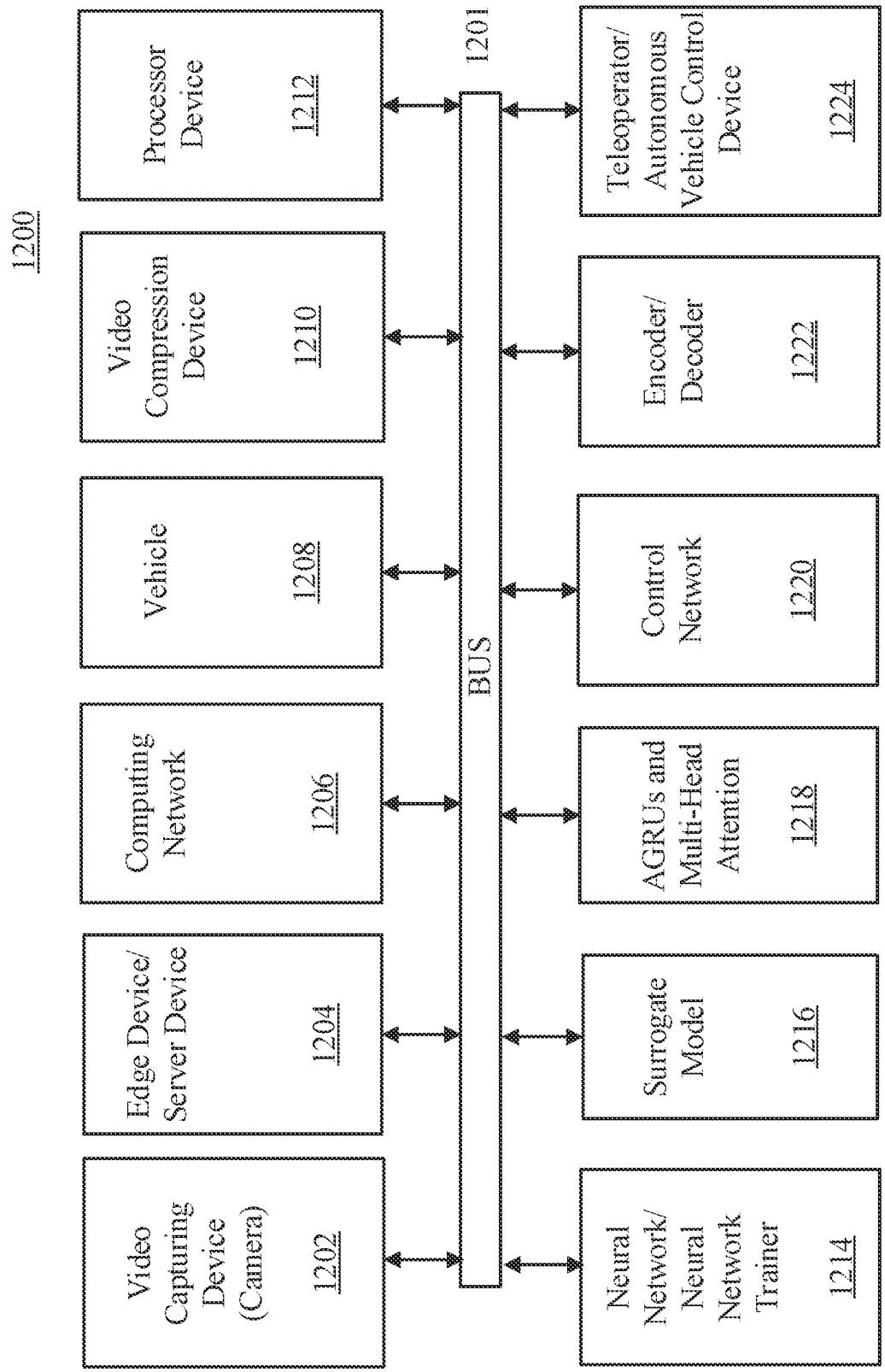
FIG. 12 is a block diagram illustratively depicting a high-level exemplary processing system for optimizing video compression control using deep learning models under varying network conditions for teleoperated vehicle control, in accordance with embodiments of the present invention.

Referring now to FIG. 12, a diagram showing a high-level exemplary processing system 1200 for optimizing end-to-end video compression control using deep learning models under varying network conditions, is illustratively depicted in accordance with embodiments of the present invention.

In various embodiments, a video capturing device (e.g., camera) 1202 can be utilized to capture video content in real-time. The system 1202 can include an edge device 1204, and can transmit data over a computing network 1206 to and from one or more server devices 1208 (e.g., cloud server), and can include one or more processor devices 1212. A video compression device 1210 can compress video, and a neural network/neural network trainer 1214 can be utilized in conjunction with the surrogate model 1216, which can include utilizing AGRUs and Multi-Head Attention 1218 and a control network 1220, which can further include an encoder and/or decoder 1222, in accordance with aspects of the present invention. A teleoperator/autonomous vehicle control device 1224 can be utilized to perform teleoperated remote control of a vehicle, and video compression can be adjusted accordingly depending on conditions and needs as identified by the control network 1220, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment," as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for optimizing video compression for remote vehicle control, comprising:
    a plurality of sensors and high-resolution cameras mounted on a vehicle for capturing video and sensor data;
    an attention-based module configured to analyze the captured video to identify critical regions within frames of the video;
    a network monitoring module to assess current and predict future network bandwidth availability;
    a control network that predicts video compression parameters based on an analysis performed by the attention-based module and the assessment by the network monitoring module, wherein the control network is configured with a differentiable model that includes a task-specific performance loss function, enabling fine-tuned prediction of video compression parameters for teleoperated driving;
    an adaptive video compression module that compresses the video based on the predicted parameters;
    a transmission module for sending the compressed video and sensor data to a remote-control center;
    a reception and decoding module at the remote-control center for decoding received video and sensor data; and
    a teleoperation control interface at the remote-control center enabling autonomous or teleoperated control of the vehicle based on the decoded video and sensor data.

2. The system of claim 1, wherein the sensors include LiDAR for capturing distance measurements, radar sensors for detecting object velocities, GPS units for precise vehicle location, and IMUs for monitoring vehicle orientation and acceleration, providing a comprehensive dataset for teleoperation.

3. The system of claim 1, wherein the attention-based module employs convolutional neural networks to dynamically segment video frames, focusing on enhancing critical regions such as road obstacles, traffic signals, and pedestrians.

4. The system of claim 1, wherein the network monitoring module utilizes predictive analytics to assess real-time and future network bandwidth conditions, ensuring adaptive streaming of video data under variable network constraints.

5. The system of claim 1, wherein the adaptive video compression module implements macroblock-wise adjustment of quantization parameters, specifically optimizing a quality of critical regions of the video identified by the attention-based module.

6. The system of claim 1, further comprising a feedback loop from the teleoperation control interface to the control network for continuous optimization of video compression parameters.

7. A method for optimizing video compression for remote vehicle control, comprising:
    capturing video and sensor data from a vehicle using a plurality of sensors and high-resolution cameras;
    analyzing the captured video to identify critical regions within frames of the video using an attention-based module;
    assessing current network bandwidth and predicting future bandwidth availability;
    predicting video compression parameters based on an analysis of the video and an assessment of the current network bandwidth using a control network, wherein the predicting video compression parameters is based on a differentiable analytics model that incorporates a performance loss function specific to teleoperated vehicle control, ensuring optimal video quality for remote operation;
    compressing the video based on the predicted parameters with an adaptive video compression module;
    transmitting the compressed video and sensor data to a remote-control center;
    decoding received video and sensor data at the remote-control center; and
    autonomously or remotely controlling the vehicle from the remote-control center based on the decoded video and sensor data.

8. The method of claim 7, further comprising dynamically assessing, using the control network, network bandwidth availability in real-time and adjusting the predicted compression parameters accordingly to optimize for both video quality and transmission efficiency.

9. The method of claim 7, further comprising capturing comprehensive environmental data using a combination of LiDAR, radar sensors, GPS, and IMUs, providing a 360-degree situational awareness for teleoperated driving.

10. The method of claim 7, further comprising employing deep learning techniques within the attention-based module to prioritize video frame regions that are critical for safe teleoperation, such as dynamic obstacles and traffic lights.

11. The method of claim 7, further comprising predicting network bandwidth fluctuations using a combination of real-time network analysis and historical data, enabling proactive adjustments to video streaming quality.

12. The method of claim 7, further comprising adaptively compressing the video by selectively enhancing a quality of critical regions while efficiently encoding less critical areas, maintaining essential visual details for teleoperation.

13. A non-transitory computer-readable storage medium comprising a computer-readable program for optimizing video compression for remote vehicle control, wherein the computer-readable medium when executed on a computer causes the computer to perform a method, comprising:
    capturing video and sensor data from a vehicle using a plurality of sensors and high-resolution cameras;
    analyzing the captured video to identify critical regions within frames of the video using an attention-based module;
    assessing current network bandwidth and predict future bandwidth availability using a network monitoring module;
    predicting video compression parameters based on results of an analysis of the video and an assessment of the current network bandwidth using a control network, wherein the predicting video compression parameters is based on a differentiable analytics model that incorporates a performance loss function specific to teleoperated vehicle control, ensuring optimal video quality for remote operation;
    compressing the video according to the predicted parameters with an adaptive video compression module;

transmitting the compressed video and sensor data to a remote-control center;

decoding received video and sensor data at the remote-control center; and autonomously or remotely controlling the vehicle from the remote-control center based on the decoded video and sensor data.

14. The computer-readable storage medium of claim 13, further comprising dynamically assessing, using the control network, network bandwidth availability in real-time and adjusting the predicted compression parameters accordingly to optimize for both video quality and transmission efficiency.

15. The computer-readable storage medium of claim 13, further comprising capturing comprehensive environmental data using a combination of LiDAR, radar sensors, GPS, and IMUs, providing a 360-degree situational awareness for teleoperated driving.

16. The computer-readable storage medium of claim 13, further comprising employing deep learning techniques within the attention-based module to prioritize video frame regions that are critical for safe teleoperation, such as dynamic obstacles and traffic lights.

17. The computer-readable storage medium of claim 13, further comprising adaptively compressing the video by selectively enhancing a quality of critical regions while efficiently encoding less critical areas, maintaining essential visual details for teleoperation.

* * * * *